(12) United States Patent
Van Der Merwe

(10) Patent No.: US 9,791,170 B2
(45) Date of Patent: Oct. 17, 2017

(54) PROCESS FOR DIRECT STEAM INJECTION HEATING OF OIL SANDS SLURRY STREAMS SUCH AS BITUMEN FROTH

(75) Inventor: Shawn Van Der Merwe, Calgary (CA)

(73) Assignee: FORT HILLS ENERGY L.P., Calgary (Alberta) (CA)

( * ) Notice: Subject to any disclaimer, the term of this patent is extended or adjusted under 35 U.S.C. 154(b) by 832 days.

(21) Appl. No.: 14/006,667

(22) PCT Filed: Mar. 19, 2012

(86) PCT No.: PCT/CA2012/050170
§ 371 (c)(1),
(2), (4) Date: Sep. 21, 2013

(87) PCT Pub. No.: WO2012/126113
PCT Pub. Date: Sep. 27, 2012

(65) Prior Publication Data
US 2014/0011147 A1 Jan. 9, 2014

(30) Foreign Application Priority Data
Mar. 22, 2011 (CA) ..................................... 2735311

(51) Int. Cl.
*C10G 1/04* (2006.01)
*F24H 9/00* (2006.01)
(Continued)

(52) U.S. Cl.
CPC .................. *F24H 9/00* (2013.01); *C10G 1/04* (2013.01); *B01D 21/0045* (2013.01); *B01D 21/26* (2013.01); *C10G 2300/807* (2013.01)

(58) Field of Classification Search
CPC ....................................................... C10G 1/04
(Continued)

(56) References Cited

U.S. PATENT DOCUMENTS

| 181,668 A | 8/1876 | Gregg et al. |
| 664,965 A | 7/1900 | Franke |

(Continued)

FOREIGN PATENT DOCUMENTS

| CA | 918091 A1 | 1/1973 |
| CA | 918588 A1 | 1/1973 |

(Continued)

OTHER PUBLICATIONS

ProSonix, PSX Technical Bulletin, TB7 Internally vs Externally Modulated Steam Control 0210, <www.pro-sonix.com>, obtained from IDS.*

(Continued)

*Primary Examiner* — Michelle Stein
(74) *Attorney, Agent, or Firm* — Baker & Hostetler LLP

(57) ABSTRACT

In the field of oil sands processing, a process for heating an oil sands slurry stream such as bitumen froth containing bitumen and water and having variable heating requirements includes injecting steam directly into the froth at a steam pressure through a plurality of nozzles to achieve sonic steam flow; operating the plurality of the nozzles to vary steam injection by varying a number of the nozzles through which the injecting of the steam occurs in response to the variable heating requirements; and subjecting the oil sands slurry stream to backpressure sufficient to enable sub-cooling relative to the boiling point of water. A corresponding system is also provided.

59 Claims, 9 Drawing Sheets

(51) Int. Cl.
  *B01D 21/00* (2006.01)
  *B01D 21/26* (2006.01)
(58) Field of Classification Search
  USPC .................................................. 208/390, 391
  See application file for complete search history.

(56) References Cited

U.S. PATENT DOCUMENTS

| | | | |
|---|---|---|---|
| 1,085,135 A | 1/1914 | Kelly, Jr. | |
| 1,147,356 A | 7/1915 | Allen | |
| 1,159,044 A | 11/1915 | Kelly, Jr. | |
| 1,201,558 A | 10/1916 | Cobb | |
| 1,254,562 A | 1/1918 | Allen | |
| 1,261,671 A | 4/1918 | Zachert | |
| 1,494,375 A | 5/1924 | Reilly | |
| 1,754,119 A | 4/1930 | Pink | |
| 1,777,535 A | 10/1930 | Walcott Stratford | |
| 2,010,008 A | 8/1935 | Bray | |
| 2,047,989 A | 7/1936 | William | |
| 2,091,078 A | 8/1937 | McKittrick et al. | |
| 2,111,717 A | 3/1938 | Young | |
| 2,188,013 A | 1/1940 | Pilat et al. | |
| 2,240,008 A | 4/1941 | Atwell | |
| 2,410,483 A | 11/1946 | Dons et al. | |
| 2,853,426 A | 9/1958 | Peet | |
| 2,868,714 A | 1/1959 | Gilmore | |
| 3,081,823 A | 3/1963 | Constantikes | |
| 3,220,193 A * | 11/1965 | Strohmeyer, Jr. | F01K 3/22 122/406.4 |
| 3,271,293 A | 9/1966 | Clark | |
| 3,278,415 A | 10/1966 | Doberenz et al. | |
| 3,291,569 A | 12/1966 | Joseph Rossi | |
| 3,575,842 A | 4/1971 | Simpson | |
| 3,705,491 A * | 12/1972 | Foster-Pegg | F01K 21/042 60/242 |
| 3,779,902 A | 12/1973 | Mitchell et al. | |
| 3,808,120 A | 4/1974 | Smith | |
| 3,901,791 A | 8/1975 | Baillie | |
| 3,929,625 A | 12/1975 | Lucas | |
| 3,954,414 A | 5/1976 | Samson, Jr. et al. | |
| 3,957,655 A | 5/1976 | Barefoot | |
| 4,013,542 A | 3/1977 | Gudelis et al. | |
| 4,035,282 A | 7/1977 | Stuchberry et al. | |
| 4,115,241 A | 9/1978 | Harrison et al. | |
| 4,116,809 A | 9/1978 | Kizior | |
| 4,120,775 A | 10/1978 | Murray et al. | |
| 4,140,620 A | 2/1979 | Paulett | |
| 4,209,422 A | 6/1980 | Zimmerman et al. | |
| 4,210,820 A | 7/1980 | Wittig | |
| 4,230,467 A | 10/1980 | Buchwald | |
| 4,251,627 A | 2/1981 | Calamur | |
| 4,284,242 A | 8/1981 | Randell | |
| 4,314,974 A | 2/1982 | Libby et al. | |
| 4,315,815 A | 2/1982 | Gearhart | |
| 4,321,147 A | 3/1982 | McCoy et al. | |
| 4,324,652 A | 4/1982 | Hack | |
| 4,342,657 A | 8/1982 | Blair | |
| 4,346,560 A * | 8/1982 | Rapier | B01D 3/007 165/45 |
| 4,395,330 A | 7/1983 | Auboir et al. | |
| 4,410,417 A | 10/1983 | Miller et al. | |
| 4,425,227 A | 1/1984 | Smith | |
| 4,461,696 A | 7/1984 | Bock et al. | |
| 4,470,899 A | 9/1984 | Miller et al. | |
| 4,495,057 A | 1/1985 | Amirijafari et al. | |
| 4,514,305 A | 4/1985 | Filby | |
| 4,518,479 A | 5/1985 | Schweigharett et al. | |
| 4,532,024 A | 7/1985 | Haschke et al. | |
| 4,539,093 A | 9/1985 | Friedman et al. | |
| 4,545,892 A | 10/1985 | Cymbalisty et al. | |
| 4,572,781 A | 2/1986 | Krasuk et al. | |
| 4,584,087 A | 4/1986 | Peck | |
| 4,609,455 A | 9/1986 | Weimer et al. | |
| 4,634,520 A | 1/1987 | Angelov et al. | |
| 4,640,767 A | 2/1987 | Zajic et al. | |
| 4,644,974 A | 2/1987 | Zingg | |
| 4,648,964 A | 3/1987 | Leto et al. | |
| 4,678,558 A | 7/1987 | Belluteau et al. | |
| 4,722,782 A | 2/1988 | Graham et al. | |
| 4,726,759 A * | 2/1988 | Wegener | F22B 1/26 166/302 |
| 4,781,819 A | 11/1988 | Chirinos et al. | |
| 4,802,975 A | 2/1989 | Mehlberg | |
| 4,822,481 A | 4/1989 | Taylor | |
| 4,828,688 A | 5/1989 | Corti et al. | |
| 4,859,317 A | 8/1989 | Shelfantook et al. | |
| 4,888,108 A | 12/1989 | Farnand | |
| 4,906,355 A | 3/1990 | Lechnick et al. | |
| 4,929,341 A | 5/1990 | Thirumalachar et al. | |
| 4,931,072 A | 6/1990 | Striedieck | |
| 4,950,363 A | 8/1990 | Silvey | |
| 4,966,685 A | 10/1990 | Hall et al. | |
| 4,968,413 A | 11/1990 | Datta et al. | |
| 5,022,983 A | 6/1991 | Myers et al. | |
| 5,039,227 A | 8/1991 | Leung et al. | |
| 5,133,837 A | 7/1992 | Elmore | |
| 5,143,598 A | 9/1992 | Graham et al. | |
| 5,186,820 A | 2/1993 | Schultz et al. | |
| 5,223,148 A * | 6/1993 | Tipman | B03B 9/02 208/390 |
| 5,236,577 A | 8/1993 | Tipman | |
| 5,264,118 A | 11/1993 | Cymerman et al. | |
| 5,282,984 A | 2/1994 | Ashrawi | |
| 5,298,167 A | 3/1994 | Arnold | |
| 5,443,046 A | 8/1995 | White | |
| 5,558,768 A | 9/1996 | Ikura et al. | |
| 5,645,714 A | 7/1997 | Strand et al. | |
| 5,690,811 A | 11/1997 | Davis et al. | |
| 5,817,398 A | 10/1998 | Hollander | |
| 5,871,634 A | 2/1999 | Wiehe et al. | |
| 5,876,592 A | 3/1999 | Tipman et al. | |
| 5,879,540 A | 3/1999 | Zinke et al. | |
| 5,914,010 A | 6/1999 | Hood et al. | |
| 5,937,817 A | 8/1999 | Schanz et al. | |
| 5,948,241 A | 9/1999 | Owen | |
| 5,954,277 A | 9/1999 | Maciejewski et al. | |
| 5,968,349 A | 10/1999 | Duyvesteyn et al. | |
| 5,985,138 A | 11/1999 | Humphreys | |
| 5,988,198 A | 11/1999 | Neiman et al. | |
| 5,997,723 A | 12/1999 | Wiehe et al. | |
| 6,004,455 A | 12/1999 | Rendall | |
| 6,007,708 A | 12/1999 | Allcock et al. | |
| 6,007,709 A | 12/1999 | Duyvesteyn et al. | |
| 6,019,888 A | 2/2000 | Mishra et al. | |
| 6,036,748 A | 3/2000 | Wallace et al. | |
| 6,076,753 A | 6/2000 | Maciejewski et al. | |
| 6,110,359 A | 8/2000 | Davis et al. | |
| 6,120,678 A | 9/2000 | Stephenson et al. | |
| 6,159,442 A | 12/2000 | Thumm et al. | |
| 6,214,213 B1 | 4/2001 | Tipman et al. | |
| 6,355,159 B1 | 3/2002 | Myers et al. | |
| 6,358,403 B1 | 3/2002 | Brown et al. | |
| 6,361,025 B1 * | 3/2002 | Cincotta | B01F 5/045 261/124 |
| 6,391,190 B1 | 5/2002 | Spence et al. | |
| 6,482,250 B1 | 11/2002 | Williams et al. | |
| 6,497,813 B2 | 12/2002 | Ackerson et al. | |
| 6,523,573 B2 | 2/2003 | Robison et al. | |
| 6,566,410 B1 | 5/2003 | Zaki et al. | |
| 6,746,599 B2 | 6/2004 | Cymerman et al. | |
| 6,800,116 B2 | 10/2004 | Stevens et al. | |
| 7,152,851 B2 | 12/2006 | Cincotta | |
| 7,357,857 B2 | 4/2008 | Hart et al. | |
| 7,569,137 B2 | 8/2009 | Hyndman | |
| 7,690,445 B2 | 4/2010 | Perez-Cordova | |
| 7,749,378 B2 | 7/2010 | Iqbal et al. | |
| 7,820,031 B2 | 10/2010 | D'Alessandro et al. | |
| 7,909,989 B2 | 3/2011 | Duyvesteyn et al. | |
| 7,934,549 B2 | 5/2011 | Cimolai | |
| 8,133,316 B2 | 3/2012 | Poncelet et al. | |
| 8,141,636 B2 | 3/2012 | Speirs et al. | |
| 8,147,682 B2 | 4/2012 | Lahaie et al. | |
| 8,157,003 B2 | 4/2012 | Hackett et al. | |
| 8,252,107 B2 | 8/2012 | Esmaeili et al. | |

(56) References Cited

U.S. PATENT DOCUMENTS

| | | |
|---|---|---|
| 8,261,831 B2 | 9/2012 | Lockhart et al. |
| 8,262,865 B2 | 9/2012 | Sharma et al. |
| 8,312,928 B2 | 11/2012 | Lockhart et al. |
| 8,343,337 B2 | 1/2013 | Moffett et al. |
| 8,354,020 B2 | 1/2013 | Sharma et al. |
| 8,357,291 B2 | 1/2013 | Sury et al. |
| 8,382,976 B2 | 2/2013 | Moran et al. |
| 8,394,180 B2 | 3/2013 | Diaz et al. |
| 8,449,764 B2 | 5/2013 | Chakrabarty et al. |
| 8,454,821 B2 | 6/2013 | Chakrabarty et al. |
| 8,455,405 B2 | 6/2013 | Chakrabarty |
| 8,550,258 B2 | 10/2013 | Bara et al. |
| 8,585,891 B2 | 11/2013 | Lourenco et al. |
| 2002/0043579 A1 | 4/2002 | Scheybeler |
| 2003/0089636 A1 | 5/2003 | Marchionna et al. |
| 2004/0074845 A1 | 4/2004 | Hagino et al. |
| 2004/0256325 A1 | 12/2004 | Frankiewicz |
| 2005/0150816 A1 | 7/2005 | Gaston |
| 2005/0150844 A1 | 7/2005 | Hyndman et al. |
| 2006/0065869 A1 | 3/2006 | Chipman et al. |
| 2006/0138055 A1 | 6/2006 | Garner et al. |
| 2006/0196812 A1 | 9/2006 | Beetge et al. |
| 2007/0125719 A1 | 6/2007 | Yarbrough |
| 2007/0180741 A1 | 8/2007 | Bjornson et al. |
| 2007/0284283 A1 | 12/2007 | Duyvesteyn |
| 2008/0000810 A1 | 1/2008 | Garner et al. |
| 2008/0185350 A1 | 8/2008 | Remesat et al. |
| 2008/0210602 A1 | 9/2008 | Duyvesteyn |
| 2009/0134059 A1 | 5/2009 | Myers et al. |
| 2009/0200210 A1 | 8/2009 | Hommema |
| 2009/0200688 A1 | 8/2009 | Cincotta |
| 2009/0294328 A1 | 12/2009 | Iqbal |
| 2009/0321322 A1 | 12/2009 | Sharma |
| 2009/0321324 A1 | 12/2009 | Sharma |
| 2010/0006474 A1* | 1/2010 | Gaston .................... C10G 1/02 208/39 |
| 2010/0076236 A1 | 3/2010 | Van Heuzen et al. |
| 2010/0078306 A1 | 4/2010 | Alhazmy |
| 2010/0089800 A1 | 4/2010 | MacDonald et al. |
| 2010/0096297 A1 | 4/2010 | Stevens et al. |
| 2010/0126395 A1 | 5/2010 | Gauthier |
| 2010/0126906 A1 | 5/2010 | Sury |
| 2010/0133149 A1 | 6/2010 | O'Connor et al. |
| 2010/0147516 A1 | 6/2010 | Betzer-Zilevitch |
| 2010/0155293 A1 | 6/2010 | Verstraete et al. |
| 2010/0155304 A1 | 6/2010 | Ding et al. |
| 2010/0206772 A1 | 8/2010 | Keppers |
| 2010/0243534 A1 | 9/2010 | Ng et al. |
| 2010/0258477 A1 | 10/2010 | Kukkonen et al. |
| 2010/0258478 A1 | 10/2010 | Moran et al. |
| 2010/0264068 A1 | 10/2010 | Ikebe et al. |
| 2010/0276341 A1 | 11/2010 | Speirs et al. |
| 2010/0276983 A1 | 11/2010 | Dunn et al. |
| 2010/0282642 A1 | 11/2010 | Kan |
| 2010/0298173 A1 | 11/2010 | Smith et al. |
| 2010/0320133 A1 | 12/2010 | Page et al. |
| 2011/0005750 A1 | 1/2011 | Boerseth et al. |
| 2011/0011769 A1 | 1/2011 | Sutton et al. |
| 2011/0061610 A1 | 3/2011 | Speirs et al. |
| 2011/0062090 A1 | 3/2011 | Bara |
| 2011/0089013 A1 | 4/2011 | Sakurai et al. |
| 2011/0100931 A1 | 5/2011 | Lake et al. |
| 2011/0127197 A1 | 6/2011 | Blackbourn et al. |
| 2011/0146164 A1 | 6/2011 | Haney et al. |
| 2011/0174683 A1 | 7/2011 | Cui et al. |
| 2011/0219680 A1 | 9/2011 | Wilkomirsky Fuica |
| 2011/0233115 A1 | 9/2011 | Moran et al. |
| 2011/0265558 A1 | 11/2011 | Feimer et al. |
| 2011/0284428 A1 | 11/2011 | Adeyinka et al. |
| 2012/0000830 A1 | 1/2012 | Monaghan et al. |
| 2012/0000831 A1 | 1/2012 | Moran et al. |
| 2012/0029259 A1 | 2/2012 | McFarlane et al. |
| 2012/0043178 A1 | 2/2012 | Kan |
| 2012/0074044 A1 | 3/2012 | McFarlane |
| 2012/0074045 A1 | 3/2012 | Stauffer et al. |
| 2012/0145604 A1 | 6/2012 | Wen |
| 2012/0175315 A1 | 7/2012 | Revington et al. |
| 2012/0217187 A1 | 8/2012 | Sharma et al. |
| 2012/0288419 A1 | 11/2012 | Esmaeili et al. |
| 2013/0043165 A1 | 2/2013 | Revington et al. |
| 2013/0081298 A1 | 4/2013 | Bugg et al. |
| 2013/0140249 A1 | 6/2013 | Sury et al. |
| 2013/0168294 A1 | 7/2013 | Chakrabarty et al. |
| 2013/0313886 A1 | 11/2013 | Van Der Merwe |
| 2013/0345485 A1 | 12/2013 | Duerr et al. |
| 2014/0001101 A1 | 1/2014 | Van Der Merwe et al. |
| 2014/0048408 A1 | 2/2014 | Van Der Merwe et al. |
| 2014/0048450 A1 | 2/2014 | Van Der Merwe et al. |
| 2014/0076785 A1 | 3/2014 | Penner et al. |
| 2014/0083911 A1 | 3/2014 | Van Der Merwe et al. |

FOREIGN PATENT DOCUMENTS

| | | |
|---|---|---|
| CA | 1027501 A1 | 3/1978 |
| CA | 1055868 | 6/1979 |
| CA | 1059052 A1 | 7/1979 |
| CA | 1072474 A1 | 2/1980 |
| CA | 1081641 A | 7/1980 |
| CA | 1111782 A1 | 11/1981 |
| CA | 1165712 A1 | 4/1984 |
| CA | 1237689 A1 | 6/1988 |
| CA | 1245990 A1 | 12/1988 |
| CA | 1247550 | 12/1988 |
| CA | 1249414 A1 | 1/1989 |
| CA | 1263331 A1 | 11/1989 |
| CA | 1267860 A1 | 4/1990 |
| CA | 1272975 A1 | 8/1990 |
| CA | 2012305 A1 | 9/1990 |
| CA | 2029795 A1 | 5/1991 |
| CA | 1291957 C | 11/1991 |
| CA | 1293465 C | 12/1991 |
| CA | 2021185 A1 | 1/1992 |
| CA | 2053016 A1 | 5/1992 |
| CA | 2053086 A1 | 4/1993 |
| CA | 2055213 A1 | 5/1993 |
| CA | 2075108 A1 | 1/1994 |
| CA | 2098656 A1 | 12/1994 |
| CA | 2123076 A1 | 11/1995 |
| CA | 2165865 A1 | 6/1997 |
| CA | 2174801 | 10/1997 |
| CA | 2188064 A1 | 4/1998 |
| CA | 2191517 A1 | 5/1998 |
| CA | 2200899 A1 | 9/1998 |
| CA | 2232929 A1 | 9/1998 |
| CA | 2149737 C | 3/1999 |
| CA | 2217300 A1 | 3/1999 |
| CA | 2254048 A1 | 5/1999 |
| CA | 2195604 C | 11/1999 |
| CA | 2350907 A1 | 5/2000 |
| CA | 2272045 A1 | 11/2000 |
| CA | 2304972 A1 | 10/2001 |
| CA | 2350001 A1 | 12/2002 |
| CA | 2353109 A1 | 1/2003 |
| CA | 2387257 A1 | 11/2003 |
| CA | 2527058 A1 | 3/2004 |
| CA | 2425840 A1 | 10/2004 |
| CA | 2454942 A1 | 7/2005 |
| CA | 2455011 A1 | 7/2005 |
| CA | 2726122 A1 | 7/2005 |
| CA | 2750837 A1 | 7/2005 |
| CA | 2750845 A1 | 7/2005 |
| CA | 2750934 A1 | 7/2005 |
| CA | 2750936 A1 | 7/2005 |
| CA | 2750939 A1 | 7/2005 |
| CA | 2750995 A1 | 7/2005 |
| CA | 2751587 A1 | 7/2005 |
| CA | 2751773 A1 | 7/2005 |
| CA | 2799354 A1 | 7/2005 |
| CA | 2799400 A1 | 7/2005 |
| CA | 2799739 A1 | 7/2005 |
| CA | 2520943 A1 | 4/2006 |
| CA | 2490734 A1 | 6/2006 |
| CA | 2502329 A1 | 9/2006 |
| CA | 2521248 A1 | 3/2007 |

(56) References Cited

FOREIGN PATENT DOCUMENTS

| | | |
|---|---|---|
| CA | 2524110 A1 | 4/2007 |
| CA | 2526336 A1 | 5/2007 |
| CA | 2567185 A1 | 4/2008 |
| CA | 2610122 A1 | 5/2008 |
| CA | 2610124 A1 | 5/2008 |
| CA | 2573633 A1 | 7/2008 |
| CA | 2673961 A1 | 7/2008 |
| CA | 2582059 A1 | 9/2008 |
| CA | 2588043 A1 | 11/2008 |
| CA | 2606312 A1 | 4/2009 |
| CA | 2610052 A1 | 5/2009 |
| CA | 2616036 A1 | 6/2009 |
| CA | 2654611 A1 | 8/2009 |
| CA | 2630392 A1 | 11/2009 |
| CA | 2669059 A1 | 12/2009 |
| CA | 2638120 A1 | 1/2010 |
| CA | 2673981 A1 | 1/2010 |
| CA | 2673982 A1 | 1/2010 |
| CA | 2641294 A1 | 4/2010 |
| CA | 2683374 A1 | 4/2010 |
| CA | 2643893 A1 | 5/2010 |
| CA | 2647855 A1 | 7/2010 |
| CA | 2649928 A1 | 7/2010 |
| CA | 2652355 A1 | 8/2010 |
| CA | 2653032 A1 | 8/2010 |
| CA | 2653058 A1 | 8/2010 |
| CA | 2689684 A1 | 8/2010 |
| CA | 2657360 A1 | 9/2010 |
| CA | 2657801 A1 | 10/2010 |
| CA | 2661579 A1 | 10/2010 |
| CA | 2711136 A1 | 10/2010 |
| CA | 2666025 A1 | 11/2010 |
| CA | 2708416 A1 | 12/2010 |
| CA | 2674246 A1 | 1/2011 |
| CA | 2708048 A1 | 1/2011 |
| CA | 2678818 A1 | 3/2011 |
| CA | 2701317 A1 | 3/2011 |
| CA | 2717406 A1 | 4/2011 |
| CA | 2729457 A1 | 7/2011 |
| CA | 2733862 A1 | 7/2011 |
| CA | 2705055 A1 | 11/2011 |
| CA | 2768852 A1 | 11/2011 |
| CA | 2748477 A1 | 3/2012 |
| CA | 2752558 A1 | 3/2012 |
| CA | 2730467 A1 | 8/2012 |
| CA | 2735311 A1 | 9/2012 |
| CA | 2737410 A | 10/2012 |
| CA | 2740935 A | 11/2012 |
| CN | 1187300 A | 7/1998 |
| EP | 0059106 A2 | 9/1982 |
| GB | 587798 A | 5/1947 |
| GB | 2044796 A | 10/1980 |
| GB | 2145730 A | 4/1985 |
| JP | S56150407 A | 11/1981 |
| JP | S57200402 A | 12/1982 |
| JP | S6285415 U | 5/1987 |
| RU | 2065455 C1 | 8/1996 |
| RU | 2078095 C1 | 4/1997 |
| RU | 2096235 C1 | 11/1997 |
| WO | 2007102819 A1 | 9/2007 |
| WO | 2009111871 A1 | 9/2009 |
| WO | 2010088388 A1 | 8/2010 |

OTHER PUBLICATIONS

Andrews et al. "Great Canadian Oil Sands Experience in Commercial Processing of Athabasca Tar Sands" American Chemical Society San Francisco Meeting Apr. 2-5, 1968, p. F5-F18.
Mitchell et al. "The solubility of asphaltenes in hydrocarbon solvents" Fuel, 1973, N. 02, vol. 52, p. 149-152.
Kemp, "Pinch Analysis and Process Integration, A User Guide on Process Integration for the Efficient Use of Energy", Second edition, Elsevier 2007.
Svreck et al "Successfully Specify Three-Phase Separators" Chemical Engineering Progress, Sep. 1994, p. 29-40.
Svreck et al. "Design Two-Phase Separators within the Right Limits" Chemical Engineering Progress, Oct. 1993, p. 53-60.
Fu et al."New technique for determination of diffusivities of volatile hydrocarbons in semi-solid bitumen", Fuel, 1979, vol. 58, August, pp. 557-560.
Kamoun et al."High Speed Shadowgraphy Investigations of Superheated Liquid Jet Atomization", ILASS-Americas 22nd Annual Conference on Liquid Atomization and Spray Systems, Cincinnati Ohio, May 2010.
Duan et al.'s "Numerical Analyses of Flashing Jet Structure and Droplet Size Characteristics" Journal of Nuclear Science and Technology, 2006, vol. 43, No. 3, p. 285-294.
Sou et al., "Effects of Cavitation in a Nozzle on liquid Jet atomization" International Journal of Heat and Mass Transfer; vol. 50, p. 3575-3582, 2007.
Ransom et al., "The relaps choke flow model and application to a large scale flow test", The American Society of Mechanical Engineers, Heat Transfer Division, 1980, Saratoga, New York.
Power,"Froth Treatment: Past, Present &Future" Oil Sand Symposium, University of Alberta, May 3-5, 2004.
Rahmani, "Shear-Induced Growth of Asphaltene Aggregates" Oil Sand Symposium, University of Alberta, May 4, 2004.
Paul et al. "Handbook of Industrial Mixing: Science and Practice" Wiley Interscience 2004, p. 391-477.
Blevins "Applied fluid dynamics handbook", Van Nostrand Reinhold Company 1984, p. 80-83.
Wu et al., "Experimental study on steam plume and temperature distribution for sonic jet" J. Phys.: Conf.Ser. 147 2009, 012079.
Yeon et al., "An Experimental Investigation of Direct Condensation of Steam Jet in Subcooled Water" Journal of Korean Nuclear Society vol. 29, No. 1, pp. 45-57, Feb. 1997.
Long et al., "Structure of water/solids/asphaltenes aggregates and effect of mixing temperature on settling rate in solvent-diluted bitumen" Fuel 2004, vol. 83, p. 823-832.
Rahimi et al., "Partial Upgrading of Athabasca Bitumen Froth by Asphaltene Removal", Unitar International Conference on Heavy Crude and Tar Sands, No. 1998.074, p. 1-8.
Hoehenberger, "Water Treatment, Cycle Chemistry, Boiler Operation and Related Problems/Failures on Steam Generator Systems > 30 bar", TÜV SÜD Industry Services, 2006, p. 1-14.
Schroyer, "Understand the Basics of Steam Injection Heating", Chemical Engineering Progress, Hydro-Thermal Corporation, May 1997, p. 1-4.
Prosonix, "PSX Steam Jet Diffuser . . . Technology That Makes a Difference", PSX Jet Diffuser Feb. 9, 2011.
Prosonix, "ProSonix Technical Bulletin", TB-4 Liquid & Steam Pressure Relationship.
Prosonix, "PSX Technical Bulletin", TB-7 Internally Modulated Steam Control 0210.
Prosonix, "Sparging Efficiency vs. Direct Steam Injection", TB-6 Sparging Efficiency & Performance Dec. 10, 2010.
Siemens, "Pictures of the Future", Spring 2006, Power Plants—Siemens Global Website, http://www.siemens.com/innovation/en/publikationen/publications_pof/pof_spring_2006/infrastructures_articles/power_plants.htm.
George, "Mining for Oil", Scientific American, Mar. 1998, p. 84-85.
Speight, "Deasphalting and Dewaxing Processes", The Chemistry and Technology of Petroleum, Fourth Edition, Chapter 19, CRC Press 2006.
Jeribi et al., "Adsorption Kinetics of Asphaltenes at Liquid Interfaces", Journal of Colloid and Interface Science, vol. 256, Issue 2, Dec. 15, 2002, pp. 268-272.
Branan, "Pocket Guide to Chemical Engineering" Elsevier Science & Technology Books, Nov. 1999.
Perry, "Perry's Chemical Engineers' Handbook" (7th Ed.), 1997.
Clarke et al., "Asphaltenes precipitation from Cold Lake and Athabasca bitumens", Petroleum Science and Technology, 1998, 16:3-4, p. 287-305.

(56) References Cited

OTHER PUBLICATIONS

Al-Atar, "Effect of Oil Compatibility and Resins/Asphaltenes Ratio on Heat Exchanger Fouling of Mixtures Containing Heavy Oil", Master Degree Thesis report, The University of British Columbia, Feb. 2000.
Gearhart, "Rose® process offers energy savings for solvent extraction", Proceedings from the Fifth Industrial Energy Technology Conference vol. II, Houston, TX, Apr. 17-20, 1983, p. 823-835.
Clarke et al., "Asphaltene precipitation: detection using heat transfer analysis, and inhibition using chemical additives" Fuel, vol. 78, Issue 7, May 1997, p. 607-614.
Shell Canada Limited, Application for Approval of the Jackpine Mine-Phase 1, ERCB application No. 1271285, May 2002.
Imperial Oil Ressources Ventures Limited, Application for the Imperial Oil Resources Ventures Limited (Imperial Oil) and ExxonMobil Canada Properties (ExxonMobil Canada) Kearl Oil Sands Project—Mine Development (Kearl Project), ERCB Application No. 1408771, Jul. 12, 2005.
Shell Canada Limited, Application for the Approval of Muskeg River Mine Project, ERCB Application No. 970588, Dec. 19, 1997.
Beckman Coulter, Particle Size and Size Distribution Analysis, Coulter Counter.com, pp. 1-3.
Outokumpu Technology, Slurry particle size analyzer, PSI 200 TM, 2006, pp. 1-8.
Johnson, Particle size distribution in clays, Clays and Clay Minerals, pp. 89-91.
Buckley et al., Solubility of the Least-Soluble Asphaltenes, Asphaltenes, Heavy Oils, and Petroleomics, Springer, 2007, Chapter 16, pp. 401-437.
Gerson et al., The Relation of Surfactant Properties to the Extraction of Bitumen from Athabasca Tar Sand by a Solvent-Aqueous-Surfactant Process, Chemistry for Energy, American Chemical Society, 1979, Chapter 6, pp. 66-79.
Nour et al., Characterization and Demulsification of Water-in-crude Oil Emulsions, Journal of Applied Sciences, vol. 7, issue 10, 2007, pp. 1437-1441.
Malcolmson et al., In-Line Particle Size Measurements for Cement and Other Abrasive Process Environments, for Presentation at the IEEE/PCA 40th Cement Industry Technical Conference, 1998, pp. 1-13.
Bui et al., "Modelling of Viscous Resuspension Using a One-Field Description of Multiphase Flows", Third International Conference on CFD in the Minerals and Process Industries, 2003 pp. 265-268.
Dispersion Technology, Inc., "Model DT-1201 . . . Acoustic and electro-acoustic spectrometer", Particle size and zeta potential measurement.
Csiro Minerals, UltraPS—Ultrasonic Particle Size Analyser, www.minerals.csiro.au.
Wedd, "Determination of Particle Size Distributions Using Laser Diffraction", Educ.Reso. for Part. Techn. 032Q-Wedd, pp. 1-4.
Rahmani et al., "Settling Properties of of Asphaltene Aggregates", Abstract, Energy Fuels, 2005, 19 (3), pp. 1099-1108.
Rahmani et al., "Fractal structure of asphaltene aggregates", Abstract, Journal of Colloid and Interface Science, vol. 285, Issue 2, May 15, 2005, pp. 599-608.
A John Brooks Website, Spraying pumping filtering, Automated Retractable Nozzle System, FluidHandlingSolutions.com.
Liang et al., "Experimental and Analytical Study of Direct Contact Condensation of Steam in Water" Nucl. Eng. Des., 147, Issue 3, Apr. 1994, pp. 425-435.
Peramanu et al., "Flow loop apparatus to study the effect of solvent, temperature and additives on asphaltene precipitation" Journal of Petroleum Science and Engineering, vol. 23, Issue 2, Aug. 1999, pp. 133-143.
Kumar, "Spreadsheet calculates critical flow", Fluid Handling, Chem. Eng. Oct. 2002.
Kumar, "Using Thermodynamic Principles to Determine the Status of Flow (choking or not)" Chem. Eng. Oct. 2002, p. 62.
William L. Luyben, "Heat-Exchanger Bypass Control", Ind. Eng. Chem. Res. 2011, 50, 965-973.
Dutta-B, "Principles of Mass Transfer and Separation Processes", p. 344, 2009.
Schaschke, Carl. (2014). Dictionary of Chemical Engineering. Oxford University Press. p. 67, Online version available at:http://app.knovel.com/hotlink/toc/id:kpDCE00021/dictionary-chemical-engineering/dictionary-chemical-engineering.
Imran Ali, "Process Heating by Direct Steam Injection", Pharmaceutical Guide; Dec. 2010.
Choung, J. et al., "Effect of Temperature on the Stability of Froth Formed in the Recycle Process Water of Oil Sands Extraction", The Canadian Journal of Chemical Engineering, vol. 82, Aug. 2004, pp. 801-806.
Wiwchar, K. et al., "Column Flotation in an Oilsand Application", Proceedings 36th Annual Meeting of the Canadian Mineral Processors, Ottawa, Ontario, Canada, Jan. 20-22, 2004.
Cleyle, P. et al., "Column Flotation Testing at Suncor Energy Inc.", Oilsand 2006 Conference, CD, University of Alberta, Feb. 22-24, 2006.
Finch, J. et al. "Column Flotation", 1st ed. Pergamon Press, 1990, pp. 1-7, 75-79, 82-89, 148-149, 152-159.
Baczek, "Paste Thickener Designs Evolving to Higher Capacy and Efficiencies", International Minimizing Supplement to Paste Tailing Management, Mar. 2007, 16 pages.
Versteeg et al., "An Introduction to Computational Fluid Dynamics: the Finite Volumn Method", 2nd Edition, Pearson Prentice Hall, First published 1995 and 2nd Edition published 2007.
Ferziger et al., "Computational Methods for Fluid Dynamics" 3rd Edition, Springer, 2002, pp. 142-151, 188-206, 226-245, 280-307, 324-328.
Hobbs, D.M., "Optimization of a Static Mixer Using Dynamical Systems Techniques" published 1998, Elsevier Science. Chemical Engineering, vol. 53, No. 18, pp. 3199-3213.
Godard, et al., "A Review of Suncor Energy's Millennium Extraction Process", Proceedings 36th Annual Meeting of the Canadian Mineral Processors, Ottawa, Ontario, Canada, Jan. 20-22, 2004, pp. 141-152.
Mankowski, et al., "Syncrude's Low Energy Extraction Process: Commercial Implementation", The British Library—"The world's knowledge", pp. 153-181.
"Choked Flow of Gases", O'Keefe Controls Co., website: www.okcc.com.

\* cited by examiner

6" INJECTOR

2" INJECTOR

PROCESS FOR DIRECT STEAM INJECTION HEATING OF OIL SANDS SLURRY STREAMS SUCH AS BITUMEN FROTH

REFERENCE TO RELATED APPLICATIONS

This application is a National Stage of International Application No. PCT/CA2012/050170, filed on Mar. 19, 2012, which claims priority to Canadian patent application no. CA 2,735,311, filed on Mar. 22, 2011, the disclosures of which are incorporated by reference in their entirety.

FIELD OF THE INVENTION

The present invention generally relates to the field of oil sands processing and in particular relates to heating of bitumen-containing slurry streams.

BACKGROUND

Known direct steam injection (DSI) technologies for heating bitumen froth streams have a number of inefficiencies, challenges and drawbacks. For instance, various DSI techniques are prone to steam hammer vibration due the collapsing of large steam bubbles. This kind of operational limitation restricts control on bitumen froth temperatures feeding downstream froth treatment processes.

Two known techniques for heating bitumen froth are the following: (i) in-line bitumen froth steam heating system comprising direct steam injectors and static mixing devices, which is described in Canadian patent No. 2,455,011 and (ii) froth heating tower heating with shed trays to contact bitumen froth with steam for heating and deaerating the bitumen froth, which is described in Canadian patent No. 1,072,474.

These known and conventional techniques have several limitations. For instance, the DSI-static mixer technique can have an operating envelop that is more limited than is sometimes desired. The steam pressure to the DSI is externally controlled. At low pressures, steam flows into the bitumen froth as unstable jets or bubbles which can collapse and thus create vibration. The high condensing rate of steam into bitumen froth in which water content aids transfer means the effectiveness of the static mixer in limiting vibration has given limitations. In addition, the heated bitumen froth may be discharged into a holding tank with a recycle pump to aid maintenance of froth temperatures, but there may be challenges regarding heating limitations of approach temperatures. In relation to the other bitumen froth heating technique, froth heating towers are large structures relative to DSI and while units can achieve high steam efficiencies with multi-stages of sheds, which force column to have high H/D ratio, at high design froth flows turndown to average or lower result in reduced steam efficiencies. Furthermore, due to elevation these froth heating structures are generally more favorably provided with separation cells to permit gravity froth flow to the heater. In addition to achieve high froth temperatures, vessels may need to be operated under pressure to keep efficiency high.

In summary, known practices and techniques for bitumen froth heating experience various drawbacks and inefficiencies, and there is indeed a need for a technology that overcomes at least some of those drawbacks and inefficiencies.

SUMMARY OF THE INVENTION

The present invention responds to the above-mentioned need by providing a process for direct steam heating of bitumen-containing slurry streams such as bitumen froth and bitumen-containing froth treatment underflows and tailings.

In one embodiment, the invention provides a process for heating an oil sands slurry stream containing bitumen and water and having variable heating requirements, comprising injecting steam directly into the oil sands slurry stream at a steam pressure through a plurality of nozzles, wherein the injecting of the steam and the size and configuration of the nozzles are provided to achieve sonic steam flow; operating the plurality of the nozzles to vary steam injection by varying a number of the nozzles through which the injecting of the steam occurs in response to the variable heating requirements for the oil sands slurry stream; and subjecting the oil sands slurry stream to backpressure sufficient to enable sub-cooling relative to the boiling point of water.

In one optional aspect, the steam pressure is at least about 150 psig or at least about 300 psig.

In another optional aspect, the steam is superheated steam.

In another optional aspect, the nozzles are each sized to have a throat diameter up to about 15 mm.

In another optional aspect, the nozzles are each sized to have a throat diameter up to about 10 mm.

In another optional aspect, the nozzles are sized and configured to each operate as an orifice and the sonic steam flow is provided according to orifice flow requirements.

In another optional aspect, the nozzles are sized and configured to each operate as a pipe and the sonic steam flow is provided according to pipe flow requirements.

In another optional aspect, at least a portion of the backpressure is provided by static pressure downstream of the injection of the steam.

In another optional aspect, the static pressure is provided by a stand pipe to a holding tank inlet.

In another optional aspect, at least a portion of the backpressure is provided by tank pressurization downstream of the injection of the steam.

In another optional aspect, at least a portion of the backpressure is provided by at least one valve device downstream of the injection of the steam.

In another optional aspect, at least a portion of the backpressure is provided by at least one pipeline configuration downstream of the injection of the steam.

In another optional aspect, the backpressure is provided to enable the sub-cooling of the oil sands slurry stream of at least 10° C. relative to the boiling point of water.

In another optional aspect, the backpressure is provided to enable the sub-cooling of the oil sands slurry stream of at least 20° C. relative to the boiling point of water.

In another optional aspect, the process also includes determining the variable heating requirements of the oil sands slurry stream based on variable temperature.

In another optional aspect, the process also includes determining the variable heating requirements of the oil sands slurry stream based on variable composition thereof.

In another optional aspect, the process also includes determining the variable heating requirements of the oil sands slurry stream based on variable water content thereof.

In another optional aspect, the process also includes serially performing the injecting of the steam into the oil sands slurry stream in a plurality of direct injection steam heaters arranged in series.

In another optional aspect, the process also includes performing the injecting of the steam into the oil sands slurry stream in a plurality of direct injection steam heaters arranged in parallel.

In another optional aspect, the oil sands slurry stream is a bitumen froth stream.

In another optional aspect, bitumen froth stream is derived from a primary separation vessel selected from at least one of an inclined plate settling vessel, a gravity settling vessel, a centrifuge and a cyclone.

In another optional aspect, the oil sands slurry stream is an underflow tailings stream from a froth separation vessel from a solvent froth treatment operation.

In another optional aspect, the solvent in the froth treatment operation is paraffinic solvent or naphthenic solvent.

In another optional aspect, the injecting of the steam forms steam jets co-directionally with flow of the oil sands slurry stream.

In another optional aspect, the backpressure is provided sufficient to enable sub-cooling relative to the boiling point of a low boiling point component having a lower boiling point than water.

In another optional aspect, the low boiling point component is a light hydrocarbon.

In another optional aspect, the injecting steam directly into the oil sands slurry stream is performed and the nozzles are positioned such that steam jets extend into the oil sands slurry stream while avoiding impingement on adjacent walls.

The invention also provides a system for heating an oil sands slurry stream containing bitumen and water and having variable heating requirements. The system includes a steam source for providing steam; a direct steam injection unit in fluid communication with the steam source and receiving the oil sands slurry stream, the direct steam injection unit comprising a plurality of nozzles for injecting the steam directly into the oil sands slurry stream at a steam pressure, wherein the nozzles are sized and configured to achieve sonic steam flow and provide to vary steam injection by varying a number of the nozzles through which the steam is injected in response to the variable heating requirements; and backpressure means for providing backpressure on the oil sands slurry stream sufficient to enable sub-cooling relative to the boiling point of water.

In one optional aspect, the steam source is configured to provide superheated steam.

In another optional aspect, the nozzles are each sized to have a throat diameter up to about 15 mm.

In another optional aspect, the nozzles are each sized to have a throat diameter up to about 10 mm.

In another optional aspect, the nozzles are sized and configured to each operate as an orifice and the sonic steam flow is provided according to orifice flow requirements.

In another optional aspect, the nozzles are sized and configured to each operate as a pipe and the sonic steam flow is provided according to pipe flow requirements.

In another optional aspect, the backpressure means comprise static pressure means downstream of the direct steam injection unit.

In another optional aspect, the static pressure means comprise a stand pipe to a holding tank inlet.

In another optional aspect, the backpressure means comprise a pressurized tank downstream and in fluid communication with the direct steam injection unit to receive the oil sands slurry stream.

In another optional aspect, the backpressure means comprise at least one valve device downstream of the direct steam injection unit.

In another optional aspect, the backpressure means comprise at least one pipeline configuration downstream of the direct steam injection unit.

In another optional aspect, the backpressure means are configured to provide the sub-cooling of the oil sands slurry stream to at least 10° C. relative to the boiling point of water.

In another optional aspect, the backpressure means are configured to provide the sub-cooling of the oil sands slurry stream to at least 20° C. relative to the boiling point of water.

In another optional aspect, the system has a supply pump for pumping the oil sands slurry stream at a sufficient pressure to allow the backpressure.

In another optional aspect, the system has a storage tank for receiving heated oil sands slurry.

In another optional aspect, the system has the storage tank comprises a slurry inlet for supplying the heated oil sands slurry thereto and controlling aeration of the heated oil sands slurry.

In another optional aspect, the slurry inlet comprises a perforated pipe extending downward from an upper portion of the storage tank to a lower portion of the storage tank below a liquid level in the storage tank.

In another optional aspect, the slurry inlet comprises a sloped launder extending from above tank high level to below tank low level.

In another optional aspect, the system has a wash line for supplying a water wash into the storage tank at or proximate an upper part of the sloped launder.

In another optional aspect, the system has a recirculation line in fluid communication with the storage tank for recirculating a portion of the heated oil sands slurry as a recycled slurry stream back into the oil sands slurry stream upstream of the direct steam injection unit.

In another optional aspect, the storage tank is configured to be atmospheric.

In another optional aspect, the storage tank is configured to be pressurized.

In another optional aspect, the oil sands slurry is bitumen froth and the system comprises a froth deaerator vessel for receiving the bitumen froth from the direct steam injection unit.

In another optional aspect, the froth deaerator vessel is configured to be pressurized with purge gas.

In another optional aspect, the froth deaerator vessel comprises a sloped launder inlet extending from above liquid level to below liquid level and being configured for inletting the bitumen froth.

In another optional aspect, the froth deaerator vessel comprises a perforated pipe inlet extending downward from an upper portion of the storage tank to a lower portion of the storage tank below a liquid level in the deaerator vessel.

In another optional aspect, the oil sands slurry is bitumen froth and the system comprises a froth slurry column for receiving the bitumen froth from the direct steam injection unit.

In another optional aspect, the froth slurry column comprises an inlet.

In another optional aspect, the inlet comprises a flow restriction, a valve or a nozzle.

In another optional aspect, the system has a return line for receiving a portion of the bitumen froth and returning the same back into the froth slurry column.

In another optional aspect, the direct steam injection unit comprises a plurality of direct steam injectors.

In another optional aspect, the direct steam injectors are arranged in series.

In another optional aspect, the direct steam injectors are arranged in parallel.

In another optional aspect, the system has a temperature control device operatively connected to the direct steam injection unit to control the nozzles thereof and connected downstream of the direct steam injection unit to monitor temperature of heated oil sands slurry stream.

In another optional aspect, nozzles are configured and positioned such that steam jets extend into the oil sands slurry stream while avoiding impingement on adjacent walls.

DETAILED DESCRIPTION

The invention provides a process for direct steam injection (DSI) heating of an oil sands bitumen-containing slurry stream such as bitumen froth.

More particularly, the DSI process is for heating an oil sands bitumen-containing slurry stream having variable temperatures requiring variable degrees of heating.

The DSI process includes injecting steam directly into the bitumen-containing slurry stream at a steam pressure through a plurality of nozzles. The injecting of the steam as well as the size and configuration of the nozzles are provided to achieve sonic steam flow. The process also includes operating the nozzles to vary steam injection by varying a number of the nozzles through which the steam injection occurs in response to the variable degrees of heating required for the bitumen-containing slurry stream. The process further includes subjecting the bitumen-containing slurry stream to backpressure sufficient to enable sub-cooling of the slurry stream relative to the boiling point of water to thereby limit flashing of the bitumen-containing slurry stream.

The oil sands bitumen-containing slurry stream preferably contains bitumen, water and particulate solid material. The slurry stream is preferably a bitumen froth. The slurry stream may also be other types of froth treatment streams such as the underflow from a bitumen froth separation vessel which may be referred to as solvent diluted tailings. The solvent diluted tailings may be derived from a naphthenic or paraffinic froth treatment process and may therefore contain an amount of naphthenic or paraffinic solvent.

Figure 2:
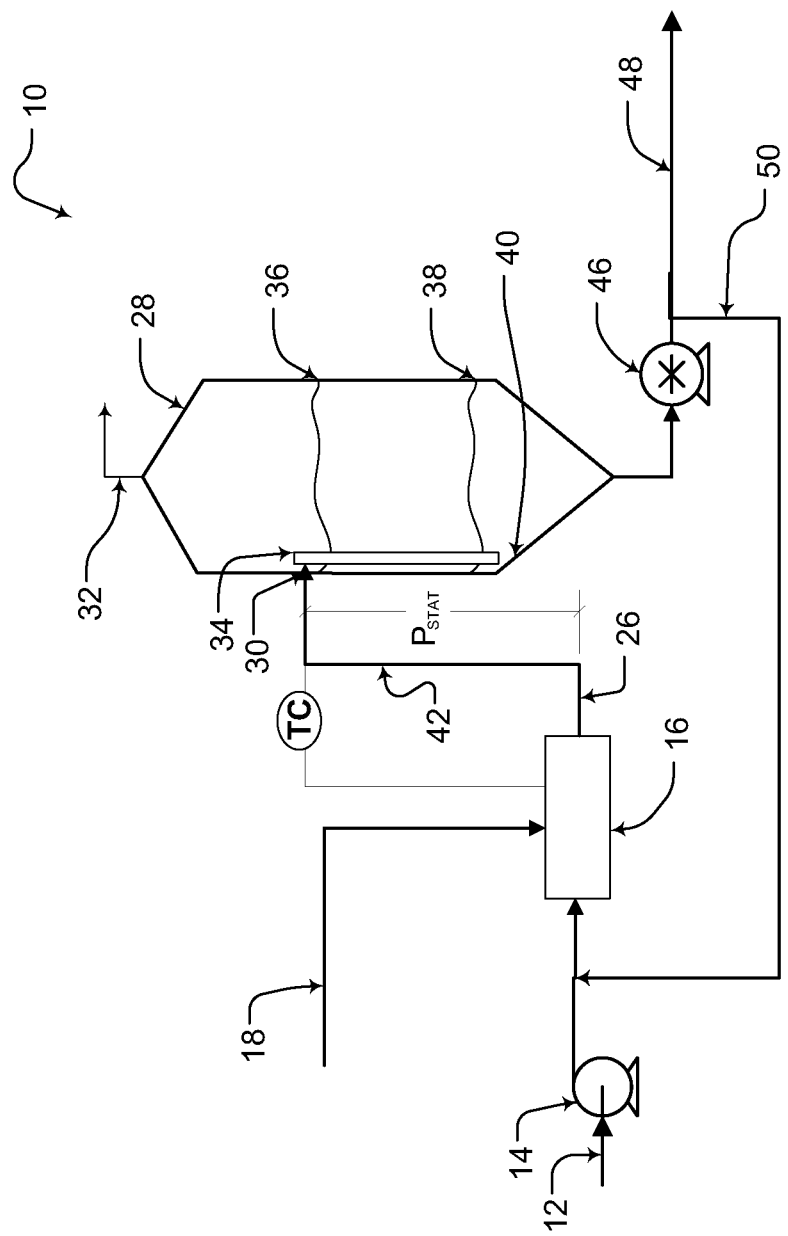
FIG. 2 is a process flow diagram of a direct steam injection installation according to an embodiment of the present invention.

Referring to FIG. 2, in this embodiment of the DSI process 10, bitumen froth 12 is supplied via a froth pump 14 to a DSI froth heating unit 16 (also referred to as the "DSI unit"). It should be noted that the DSI unit 16 may include one or more DSI froth heaters, which may be configured in series and or parallel arrangement as will be described further herein below. Steam 18 is also supplied to the DSI froth heating unit 16 to heat the bitumen froth 12.

Preferably, the bitumen froth 12 is from primary bitumen extraction processes such as the hot water process or variations thereof. The bitumen froth 12 may be partially deaerated by upstream process operations such as static deaeration, for example as is described in CA 2,387,257, or steam deaeration, for example as described in CA1,072,474.

The froth pump(s) 14 pressurize the bitumen froth to the required backpressure at the DSI unit 16 in conjunction with the downstream configuration.

Figure 1:
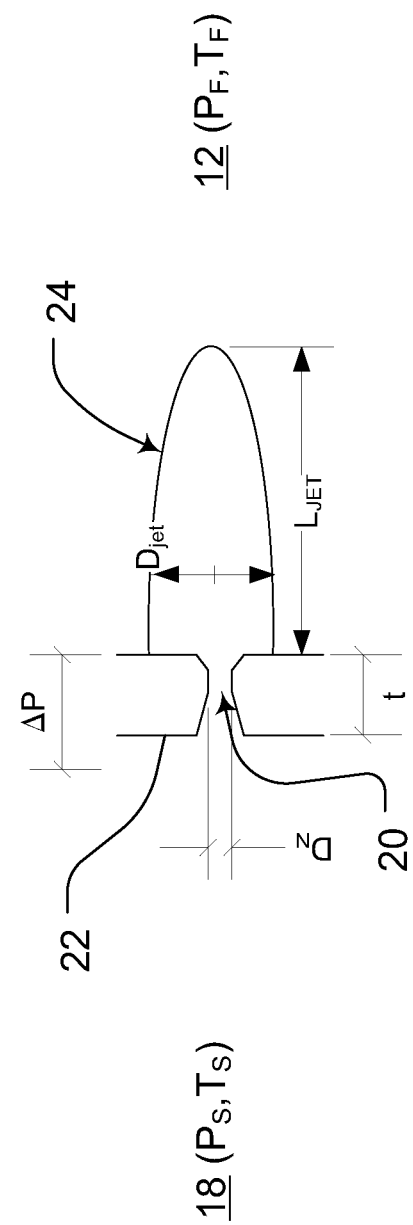
FIG. 1 is a plan cross-sectional view of a steam injection nozzle in connection with an embodiment of the present invention.

Referring now to FIG. 1, the steam is injected via nozzles into bitumen froth. In one aspect, each steam injection nozzle 20 may comprise a converging section which converges to a smaller diameter know as the throat followed by a diverging section which increases in size. The nozzle 20 may be defined within a plate 22. The nozzle 22 has a throat diameter $D_N$ and a thickness t. The steam nozzle is configured and operated to provide a sonic steam jet 24. The sonic steam jet 24 has a jet diameter $D_{JET}$ and a jet length $L_{JET}$. The steam 18 is provided at steam pressure $P_S$ and steam temperature $T_S$ while the bitumen froth 12 is provided at a froth pressure $P_F$ and a froth temperature $T_F$.

Still referring to FIG. 1, the nozzles 20 may have various sizes and configurations and arrangements in the DSI unit.

In the case that the nozzle length, i.e. plate thickness t, is a relatively small fraction of the steam supply pipe and nozzle diameter $D_N$, then sonic flows through the nozzle 20 may be achieved per the following Equation I:

$$\left(\frac{p_j}{p_i}\right)^{(1-\gamma)/\gamma} + \frac{\gamma-1}{2}\left(\frac{d}{D}\right)^4\left(\frac{p_j}{p_i}\right)^{2/\gamma} = \frac{\gamma+1}{2}.$$

where:
$p_i$ is the static pressure measured upstream of the orifice plate;
$p_j$ is the static pressure measured downstream of the orifice plate;
d/D is the orifice diameter ratio; and
γ is ratio of specific heat at constant pressure to that at constant volume.

Equation I corresponds to equation 6-48 in "*Applied fluid dynamics handbook*", Blevins. R. Van Nostrand Reinhold Company 1984 (hereafter "Blevins"). The maximum flow velocity occurs when the orifice throat velocity just equals the speed of sound. This occurs when equation 1 holds true. To be considered sufficiently "small" the nozzle plate thickness t should be less than $D_N/8$ as per equation 6-34 of Blevins.

In the case that the direct steam injection system is implemented in a scenario where the orifice sonic flow calculation methodologies are not appropriate, for instance where the pressure differential requires plate thicknesses exceeding Blevins guideline for orifice sonic flow calculations, then the nozzle is preferably considered as a pipe which requires pipe flow calculation methods. Pipe flow calculation methods are provided, for example, in "*Spreadsheet calculates critical flow*" Kumar, S. Chem. Eng. October 2002 (hereafter "Kumar"), and can be used to determine sonic conditions and ensure they are met.

Example calculations and methodologies for applicable scenarios are presented in the Example section below.

It is noted that for both of the orifice flow and pipe flow calculations the steam pressure upstream of the nozzle should consider the hydraulic losses from the steam supply source. Taking into account hydraulic losses including internal losses within the DSI unit provides advantages in calculation accuracy which corresponds to improved process stability and functionality.

In another optional aspect, for sonic flow conditions the pressure ratio $P_F/P_S$ is lower than the critical pressure ratio, for example with superheated steam, $P_C/P_S=0.545$.

This latter pressure ratio is for the case using a superheated steam and if lower quality steam is used then the ratios and conditions of the DSI process may also change. As mentioned above, the steam supply pressure $P_S$ upstream of the nozzle plate is preferably the pressure adjusted for all pressure losses due to fittings and piping from the steam supply source.

Referring to FIG. 1, for sonic flow the nozzle diameter $D_N$ coupled with the pressure conditions causes the steam jet 24 to extend into the froth slurry 12. The steam jet is stable for improved heating stability.

The DSI unit comprises multiple nozzles 20 such as the one shown in FIG. 1. It should be noted that many different types and constructions of DSI unit may be used in conjunction with the present invention and are described in the literature or are commercially available. The multiple nozzles 20 provide the required steam flow to heat the froth slurry 12 to the desired froth temperature $T_F$, which is controlled by regulating or varying the number or nozzles through which steam passes. This may be accomplished by a number of mechanical arrangements which are well known for steam heater devices. The number of nozzles may be provided to allow sufficient heating capacity for the given oil sands slurry stream and its heating requirements. The DSI unit should be equipped and constructed so as to vary the number of working nozzles injecting steam to allow sufficient adjustments in response to lower heating requirements of the oil sands slurry stream. For instance, if it is expected that a slurry stream with highly variable compositions or incoming temperatures is to be heated, then the DSI unit should be accordingly provided with a corresponding sufficient number of nozzles and corresponding functionality to vary the number of nozzles through which steam passes. In another preferred aspect, the nozzles function in an on/off mode and are either fully open for injecting steam or fully closed.

Sonic flow through a specific nozzle causes a stable steam jet. Some information on steam jets is outlined in "*Experimental study on steam plume and temperature distribution for sonic jet*" Wu. X et al., 2009 J. Phys.: Conf. Ser. 147 01279 (hereafter Wu et al.), showing characteristic lengths and diameters. For water systems, the jet length and diameter have models which are considered applicable to bitumen froth due to the froth water content aiding condensation. In one aspect, the specific length of the jet is provided or oriented so as not to impinge on the froth pipe which would result in erosion. The diameter of the jet influences the spacing between nozzles. In one aspect, throat diameters up to 15 mm are acceptable with preference for 10 mm with variance to account for impingement and spacing issues.

The DSI unit preferably comprises a steam injection component (not shown) that extends into a oil sands slurry pipeline. The steam injection component may take the form of elongated conduit extending perpendicularly or obliquely into the flow of the oil sands slurry stream. The on/off mode of the nozzles may be regulated along the steam injection component so as to distribute the heating along the width of the slurry stream pipeline. It should also be understood that various other arrangements of the steam injection component and the slurry stream transport means may be used.

In one aspect, the backpressure $P_F$ on the bitumen froth 12 downstream of the DSI unit is provided to ensure prevention of vaporization of froth slurry components for improved steam jet condensing and stability. In the case of bitumen froth as the oil sands slurry stream, the $P_F$ is preferably at least 10° C., and still preferably at least 20° C., above the boiling point of water.

As for the steam pressure $P_S$, it is preferably provided above the critical pressure for sonic flow through the nozzles in all operating cases. Thus, for variable heating requirements, the steam pressure $P_S$ should be designed or provided to be sufficient for all conditions. The steam pressure is preferably selected to maintain sonic conditions under maximum backpressure conditions. At sonic conditions the mass flow rate through the nozzle is a constant value for a fixed steam pressure where the ratio of the critical pressure $P_C$ to inlet pressure $P_S$ (per figures) ratio that depends on the specific heat ($\gamma$) ratio of steam: $P_C/P_S=(2/(\gamma+1))^{\gamma/(\gamma-1)}=0.545$ for superheated steam. This may be referred to as choked flow. By way of example, a steam supply pressure around nominal 300 psig or 2068 kPag can provides for sonic flow conditions across the nozzle with a stable steam jet and with appropriate backpressure conditions can heat the bitumen froth up to 130° C. if desired. Achieving such high temperatures may allow improvements in downstream processing, for instance improved settling rates for in a solvent froth treatment settling apparatus.

The steam temperature $T_S$ is preferably 10° C. to 15° C. of superheat, preferably containing no condensate. Condensate-containing steam can lead to vibration and/or damage to steam nozzles and related equipment.

In one aspect, the oil sands slurry stream comprises or consists of bitumen froth. Bitumen froth slurries contain multiple phases that do not have equal distribution in the system and contain widely varying heat capacities and boiling points. Most water based systems are very forgiving should sonic conditions be marginal. However, multiphase froth and froth slurry systems are less forgiving, partly due to the fact that extreme erosion effects and unstable conditions can result due to high vapour pressure flashing without adequate backpressure. By utilizing the application of pressure and backpressure, both stability and wear avoidance are improved. It is noted that some applications of steam heating of froth slurries may appear stable under certain regimes due to a stable vapour section being formed downstream of the DSI heater which acts as a dampener for the system; however, multi-phase hydrodynamics are sensitive to flow regimes and can become unstable.

Figure 7:
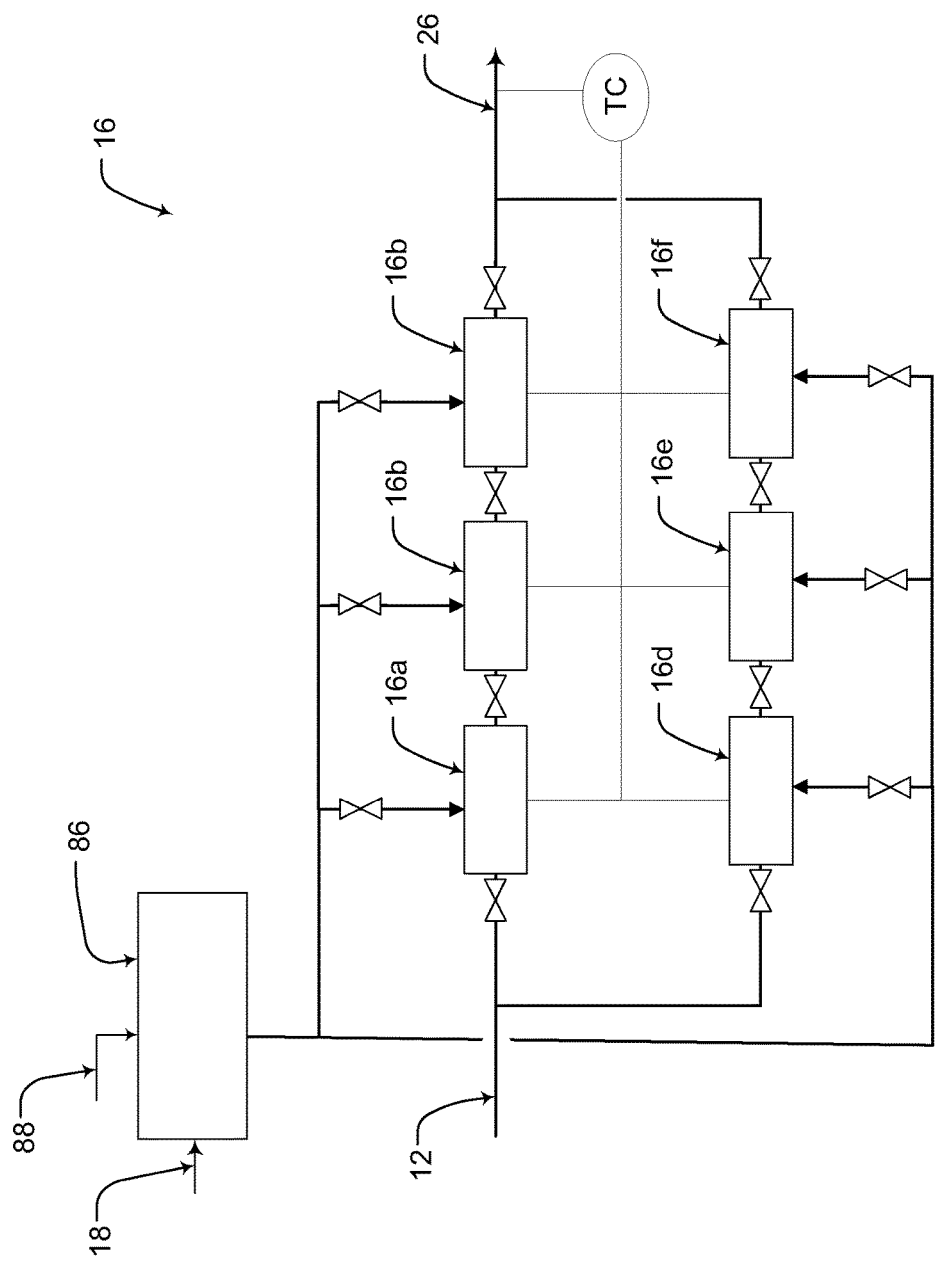
FIG. 7 is a process flow diagram of a direct steam injection configuration according to an embodiment of the present invention.

In another aspect, the maximum heat demand required by the DSI unit may be provided by multiple steam injection components in parallel. The total number of steam injection components may be distributed over a number of DSI heaters 10a, 10b, 10c, 10d, 10e, 10f, which are arranged in a series and/or parallel configuration as illustrated in FIG. 7, and make up the overall DSI unit 10. The configuration between series and parallel permits DSI maintenance without restricting froth heating capacity as DSI heaters are relatively inexpensive. The temperature of the bitumen froth ($T_F$ FIG. 1) may be regulated by varying the number of nozzles and/or steam injection component admitting steam. Specific internal designs of DSI heaters are disclosed in U.S. Pat. No. 7,152,851 US published application No. 2009/0200688. As mentioned above, various different types of DSI heater designs may be used in connection with the present invention.

Referring to FIGS. 2 to 7, DSI unit 10 produces a heated oil sands slurry stream 26. The heated stream 26 may be given a generally constant temperature by varying the heat input of the DSI unit 10.

Figure 3:
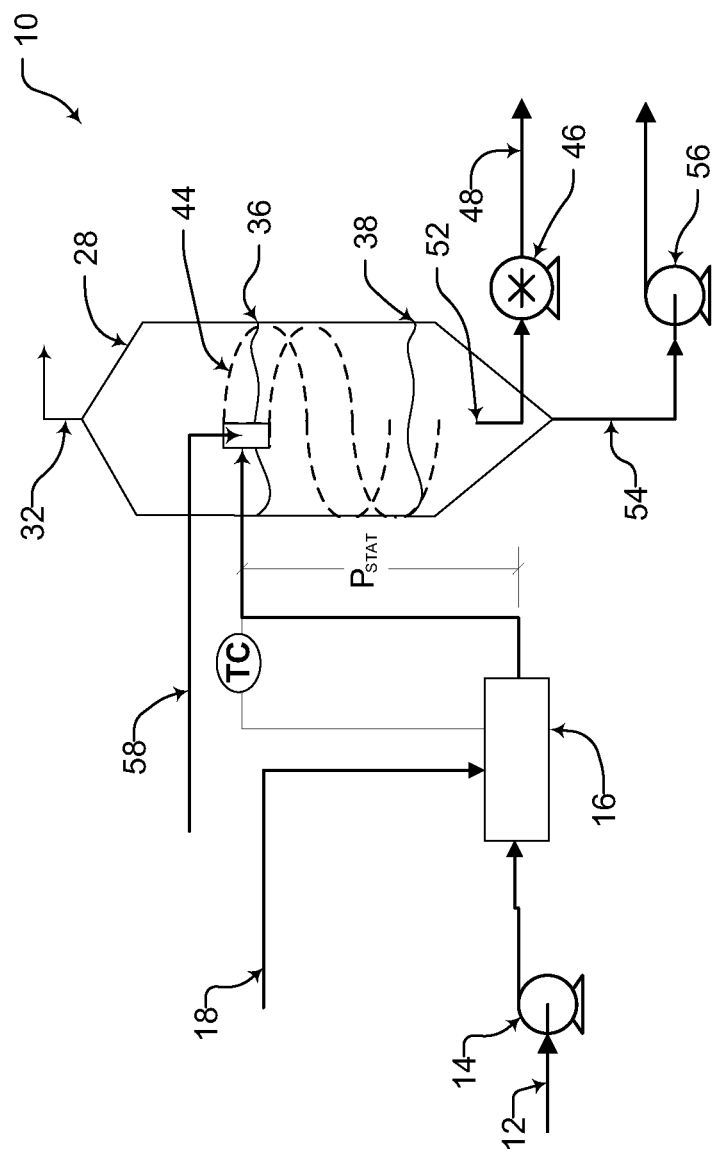
FIG. 3 is a process flow diagram of a direct steam injection installation according to another embodiment of the present invention.

Referring to FIGS. 2 and 3, the backpressure on bitumen froth may be maintained by static pressure $P_{STAT}$. The system 10 may include a froth storage tank 28 which has an inlet 30 for providing the heated bitumen froth 26 within the cavity of the tank 28. The froth storage tank 28 may also include an atmospheric vent 32. The tank inlet 30 may comprise a perforated pipe 34 which is located within the tank cavity and extends from above the tank high level 36 to below the tank low level 38. The perforations permit vapours to evolve from the heated froth and restrict the entrainment of vapour into the froth inventory. There is also a discharge zone 40 of the perforated pipe 34 located below the low level 38 and is optionally erosion-protected by a hard surface, plate or reinforced area or the like. To minimize erosion due to minerals impinging on the wall of the froth tank, the zone around the discharge point of the perforated pipe may be protected by replaceable abrasion resistant materials such as chrome carbide overlaid plates.

Due to cost considerations, froth storage tanks 28 are typically designed for atmospheric pressure with venting 32 to maintain atmospheric pressures. With atmospheric pressure and practical stand pipe 42 elevations the steam jet stability limits bitumen froth temperatures to 95° C. By setting a constant static head and regulating the pressure in the froth storage tank 28, froth temperatures up to 130° C. are available from 2069 kPag steam with even higher temperatures available with higher steam pressures needed to provide sonic steam flows across the nozzles.

Referring now to FIG. 3, the perforated pipe may be replaced by a sloped launder 44, which may have an angle between about 10° and about 30°. This launder 44 provides two functions: firstly, the sloped lauder 44 permits heated bitumen froth 26 to release residual entrained gases not removed by upstream deaeration systems and dissolved vapours from the heating of water and hydrocarbons; secondly, the sloped launder 44 inhibits the re-entrainment of gases into bitumen froth which tends to foam with entrained vapour.

Referring to FIGS. 2 and 3, the froth from the froth storage tank(s) 28—there may be a single tank or multiple tanks in parallel to provide the required storage—is pumped via froth tank pump(s) 46 from the froth tank 28 to a froth treatment process. The froth treatment process may be naphthenic or paraffinic based process. In one aspect, the froth treatment process is a high temperature paraffinic froth treatment (PFT) process, which operates at temperatures of at least about 70° C. In one aspect the PFT process operates between about 70° C. and about 90° C. In another aspect the PFT process operates above about 90° C. In another aspect the PFT process operates above about 100° C., and may even operate up to about 130° C. in some cases. The supply stream of froth 48 may be further pre-treated before entering a froth separation vessel, e.g. a gravity settling vessel.

The storage tank froth can be optionally recycled back to the froth heater to maintain consistent flows through heater and tank when froth supply varies. Accordingly, referring to FIG. 2, the system 10 may include a recirculation line 50.

Referring to FIG. 3, suction 52 of the froth tank pump 46 may optionally be elevated within the conical section of the froth tank 28 and there may be a lower drain 54 for water removal either by gravity or a froth water pump 56. In normal operation, some froth water and associated minerals may separate from the froth. In addition, there may be an optional flush water stream 58 in order to aid with control of depositions within the tank.

Figure 4:
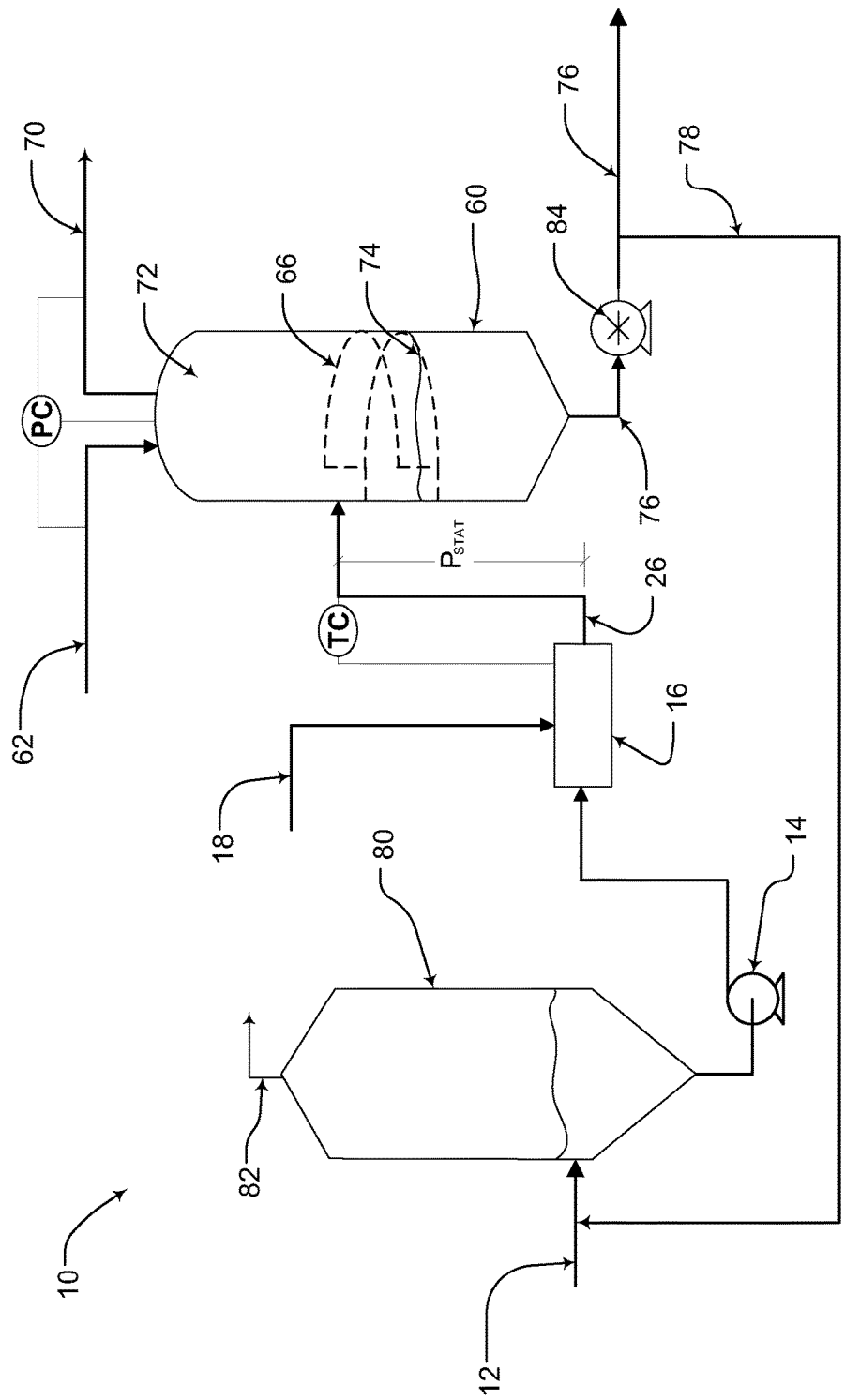
FIG. 4 is a process flow diagram of a direct steam injection installation according to yet another embodiment of the present invention.
Figure 5:
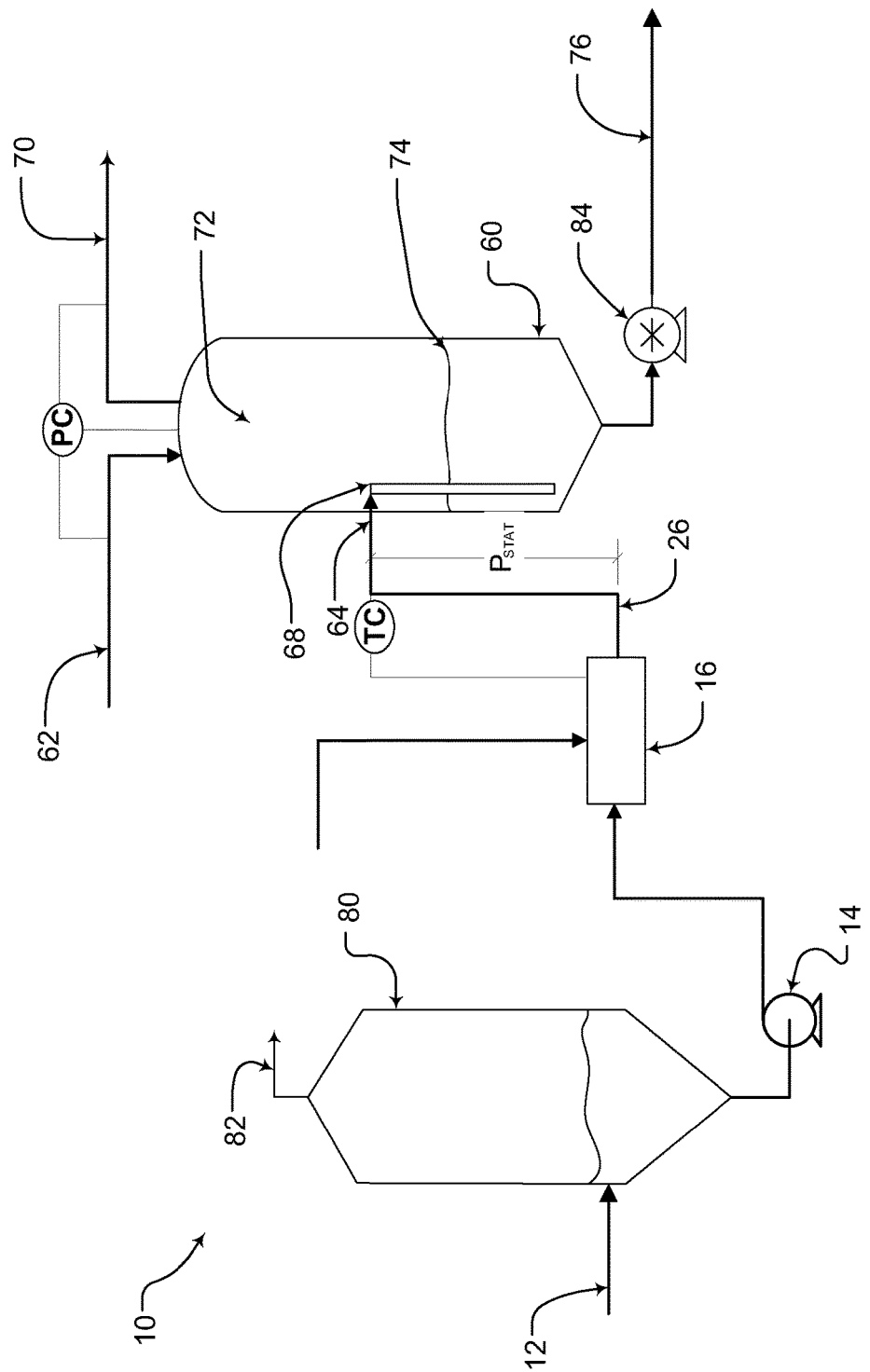
FIG. 5 is a process flow diagram of a direct steam injection installation according to a further embodiment of the present invention.

FIGS. 4 and 5 illustrate variations of the system where the DSI unit 16 produces the heated froth 26 which is then fed to a froth deaeration vessel 60. The deaerator vessel 60 is a pressure rated vessel in which purge gas 62 is added to increase the backpressure on the DSI unit 16. This facilitates increasing allowable froth temperature up to about 130° C. with 2068 kPag steam. The embodiment shown in FIG. 4 has a froth inlet 64 on a sloped launder 66 while FIG. 5 has the froth inlet 64 to a perforated pipe 68 (similar to FIGS. 2 and 1 respectively). Note that sub-surface addition of the froth avoids entrainment of vapour into the froth prior to pumping. In an optional aspect, heaters may be directly mounted on the deaeration vessel and froth may be recirculated to blend froth temperature. For either option, the evolved vapours are vented through a vent gas line 70. The deaerator vessel 60 thus has a pressure regulated vapour space 72 above the liquid froth level 74. Preferably, the deaerator vessel 60 is elevated relative to the DSI unit to provide at least one meter of static head with appropriate allowances to limit variability due to hydraulic flow variation.

Referring to FIG. 4, the heated storage froth 76 can be recycled back into an upstream part of the system via a recirculation line 78, preferably back to an upstream froth storage or surge tank 80, to maintain flow and temperatures when froth supply varies. The froth storage or surge tank 80 preferably has an atmospheric gas vent 82 as illustrated.

Referring to FIGS. 4 and 5, the deaerator vessel 60 preferably has a froth outlet pump 84 which supplies the bitumen froth to downstream processing such as solvent froth treatment.

Referring to FIG. 7, the steam is preferably provided as superheated steam. In some cases the steam source provides the steam highly superheated and there is an optional de-superheater device 86 which mixes condensate 88 with the over-superheated steam to produce the steam supply for the heaters 16a to 16f. The de-superheater enhances the reliability of the process. Isolation valves are provided to permit removing specific units from service, e.g. for maintenance. A temperature controller regulates the number of nozzles admitting steam for heating. In event the steam source supplies low quality wet steam, the condensate is preferably trapped out and pressure adjusted to superheat conditions before supplying the superheated steam to the heaters. In one optional aspect, the process may include limiting the maximum temperature of the heated froth slurry due to pressure differential across nozzles.

Figure 6:
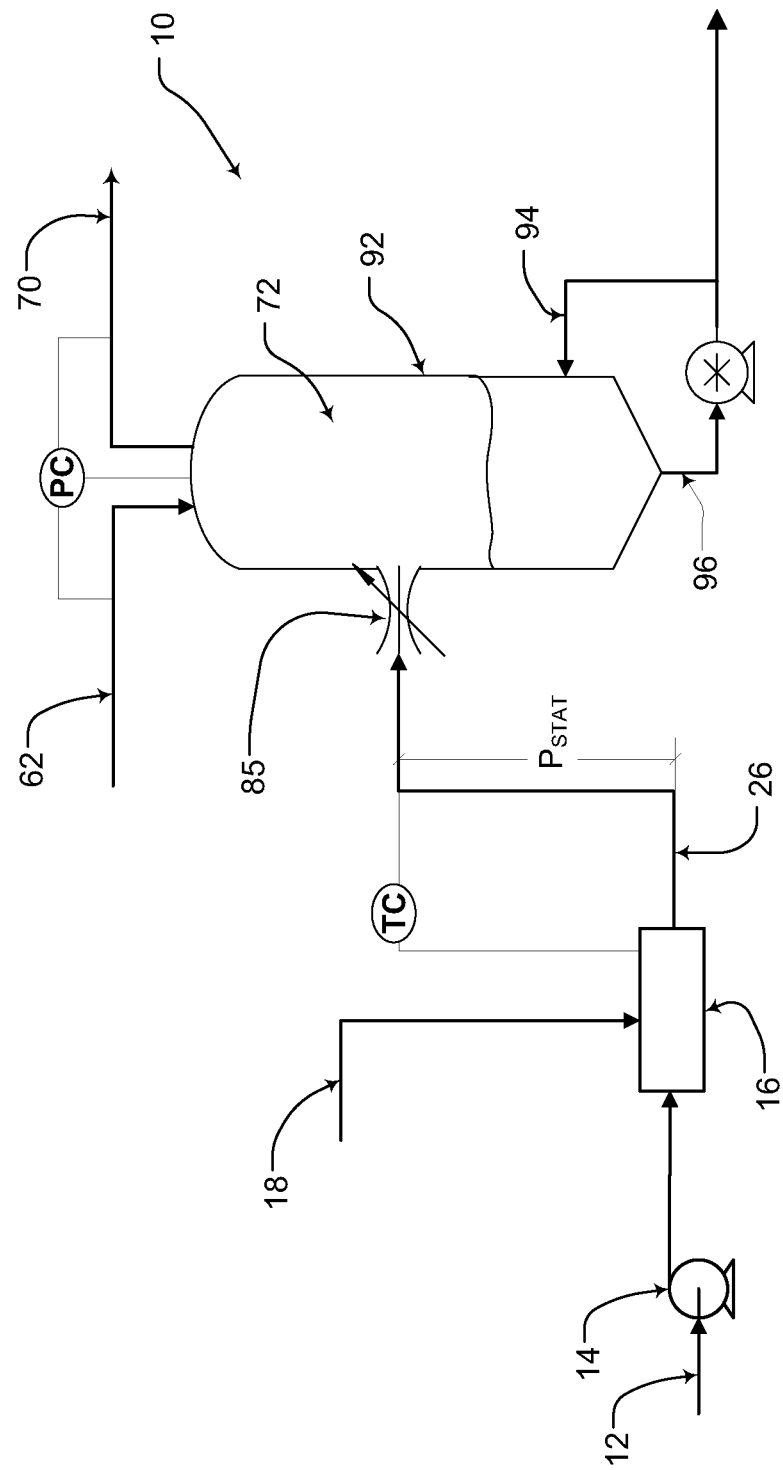
FIG. 6 is a process flow diagram of a direct steam injection installation according to yet a further embodiment of the present invention.

Referring to FIG. 6, the froth slurry backpressure may be controlled by static head and a flow restriction mechanism 90, which may be a valve, nozzle or other type of fitting or device. FIG. 6 also shows supplying the heated oil sands slurry stream 26 to a column 92 which may be a froth slurry column or a tailings solvent recovery column or the like. The flow restriction mechanism 90 permits vapour release from the heated slurry into the column 92 upon introduction therein. The column 92 may also have a bottom return line 94 for returning a portion of the bottoms 96 back into the column 92 as a returned slurry stream 94, while another portion 98 is sent for downstream processing.

The embodiment of the system 10 illustrated in FIG. 5 is preferably used for heating bitumen froth, but the oil sands slurry stream 12 may alternatively be froth treatment tailings. Froth treatment tailings (also known as "solvent diluted tailings") are normally derived from the underflow of a froth settling vessel. Froth treatment tailings contain solvent that was used in to help separate the bitumen from the water and solids in the settling vessel and the solvent, which may be naphthenic or paraffinic solvents, are present in the tailings which are treated to recover the solvent. In this regard, the DSI heating process and system of the present invention may be used to heat froth treatment tailings as the slurry stream 12.

In one preferred aspect, the DSI unit is arranged to heat a recirculation stream of the tailings in connection with a tailings solvent recovery unit. More specifically, the tailings solvent recovery unit for recovering a solvent from a solvent diluted tailings derived from a bitumen froth treatment process, comprises a separation apparatus for receiving the solvent diluted tailings and producing a solvent component and a solvent recovered tailings component. The separation apparatus comprises a vessel comprising a solvent removal section for accommodation removal of the solvent from the solvent diluted tailings and a bottom section for accumulation of the solvent recovered tailings component; a tailings outlet for releasing the solvent recovered tailings component from the vessel; a solvent outlet for releasing the solvent component from the vessel as a vaporized solvent; and a tailings inlet for supplying a variable flow of the solvent diluted tailings to the vessel. The separation apparatus also comprises a tailings recycle line in fluid connection with the tailings inlet for recycling a portion of the solvent recovered tailings component as a recycled tailings component into the variable flow of the solvent diluted tailings to produce a flow rate controlled feed for introduction into the vessel. Preferably, there is a feed heater associated with the tailings inlet for heating the flow rate controlled feed to a controlled inlet temperature and the feed heater is provided as a DSI unit and the tailings solvent recovery unit feed heating is operated in accordance with the present invention. In addition, the tailings solvent recovery unit may have a recycle stream heater associated with the tailings recycle line for heating the recycled tailings component prior to introduction into the solvent diluted tailings and the recycle stream heater is provided as a DSI unit and the tailings solvent recovery unit recycle heating is operated in accordance with the present invention.

In one embodiment, where paraffinic solvent is used in the froth treatment process and the froth treatment tailings thus contain paraffinic solvent for recovery, the TSRU-DSI heating variant is preferably applied in combination with a recirculation system.

In another embodiment, wherein naphthenic solvent is used in the froth treatment process and the froth treatment tailings thus contain naphthenic solvent for recovery in a naphtha recovery unit (NRU), the ability to closely control NRU feeds at temperatures above the froth treatment tailing temperature allows maximizing naphtha recovery as overhead condensing systems can foul.

The process and system of the present invention is an enhancement providing stable steam injection into bitumen froth or other streams without need of static mixers, though it should be noted that static mixers may be used in some embodiments. Static mixers may be avoided in the DSI system to improve consistent bitumen froth feed temperatures to froth treatment operations over an extended operating envelope.

In one aspect, the DSI system uses full steam pressure to jet the steam into the froth and ensure stable heating of the froth. In addition, the DSI system allows heating froth in excess of 100° C., while existing systems are limited to less than 95° C. In another aspect, the DSI system is preferably an in-line device requiring limited plot space; no static mixers or heating vessels are required which significantly reduces process infrastructure. In another aspect, the DSI system can be coupled with deaeration methods in tanks and vessels to minimize vapour entrainment in froth treatment feed and lowering venting volumes.

Embodiments of the present invention provide a number of advantages. For instance, bitumen froth produced by the "hot water" process contains significant water as reflected by natural froth lubricity for pipelining bitumen froth. The water content in froth or froth slurry allows heat transfer properties of water to aid direct heating by steam: steam condenses into water phase and the water phase transfers heat to bitumen and minerals faster than if heat transfer was controlled by bitumen properties. Note that this is considered at normal froth temperatures, e.g. up to 80° C. bitumen is viscous. Furthermore, the pressure of the steam relative to the fluid results in sonic flows across orifices that cause stable jets penetrating into the froth slurry. In addition, specifying sufficient backpressure on the heater allows controlling vaporization of fluids to which the steam is injected. For example, the efficiency of direct steam condensing reduces significantly as water approaches boiling point with the steam jet becoming unstable as gaseous vapour bubbles expand exponentially towards boiling. For this reason, direct steam injection preferably performed with froth slurry temperatures with at least 10° C. of sub-cooling relative to the boiling point of water. By specifying and controlling backpressure, froth slurry temperatures above those for atmospheric tanks can be achieved. Furthermore, specifying the steam pressure and temperature to the DSI unit ensures critical choked or sonic flow is available over the operating envelope for reliable operation of the DSI unit without internal condensation in the unit prior to injection. 2068 kPag steam (nominal 300 psig) may permit heating froth to about 130° C., for example. In addition, as FIG. 7 illustrates, the DSI units can be arranged in a series/parallel configuration to cover a wide range of operational needs. The maximum heat demand defines the number of heaters needed to inject steam. The nozzles in individual heaters can be specified to optimize the temperature control.

EXAMPLES

Methodologies, Calculations & Guidelines

Objective: The following provides a methodology to calculate appropriate conditions to heat froth or froth slurries using sonic direct steam injection (hereafter referred to as SDSI).

Method: The method is based on developed spreadsheets and fundamentals augmented by practical experience.

Bases:
1) Froth stream conditions of potential commercial plant.
2) ASME/ANSI B36.10/19.
3) Blevins for orifice calculation.
4) SpiraxSorco steam tables.
5) VBA code using IAPWS-IF97 property constants for water.

6) Kumar, S. Chem. Eng. October 2002, p. 62. *Using Thermodynamic Principles to Determine the Status of Flow* (choking or not). This removes the use of plots as generated in Crone Manual for adiabatic compressible flow.
7) Chen's equation for friction factor $f_r$.
8) API 14.3 Gas Measurement Committee tests for maximum steam flow through orifices using API 14.3 plate. To verify assumptions.

Assumptions:
1) No bitumen components will flash.
2) Water in froth can be used under a worst case scenario as the only component absorbing steam energy—assumption avoids unknowns around change in state as temperature increases.
3) No one calculation adequately expresses multiphase fluid conditions and transitions. A general guideline is adequate as long as it covers all conditions and ensures the system is protected under the worst case condition. Overdesign on the less critical condition is assumed to be acceptable.
4) Conditions are closer to isothermal expansion.

Calculations: shown herein-below.

Conclusions: Knowledge of steam and its behaviour as well as the guidelines expressed in the calculations allows for a reasonably well behaved sonic steam injection system to be designed.

It should be understood that due to the variable nature of the stream being heated unpredictable behaviour can arise unless the stream is well understood or safe general over-riding assumptions are made.

Heat transfer coefficients for froth based streams can be generated in a similar manner to Wu. X et al. *"Experimental study on steam plume and temperature distribution for sonic jet"* 2009 J. Phys.: Conf. Ser. 147 01279; Liang et al., *"Experimental and Analytical Study of Direct Contact Condensation of Steam in Water"* Nucl. Eng. Des., 147, pp. 425-435; and Yeon S K et al., *"An Experimental Investigation of Direct Condensation of Steam Jet in Subcooled Water"* Journal of Korean Nuclear Society Vol 29, Number 1, pp 45-57, February 1997. Generating values for the actual streams the injection will be used in will improve the accuracy of the calculations due to the uniqueness of each stream.

Recommendations:
1) Err on the side of more injections points than calculated, e.g. if need 2 as a minimum add 3.
2) Do not try to be too economical on backpressure as this is a powerful lever in commissioning the operation.
3) Backpressure helps to reduce the vapour component volume of the stream to prevent negative impacts with steam heating.
4) Add additional spacing between holes to account for stream crossflow to prevent holes joining steam plumes resulting in vibration and hammer risks.

Example Calculations

I. Define the system:
   Atmospheric pressure, streams inlet and outlet temperatures, stream composition prior to heating; steam pressure and conditions available.
   Perform a preliminary hydraulic calculation to determine the static line pressure (not stagnation pressure) at points upstream of the heater (at both minimum and maximum flow conditions) as well as determine the hydraulic head pressure (static head) at the heater discharge.

II. Based on the stream composition determine the energy required to cause the temperature change (use Cp values of the stream components).

III. Start with a steam pressure. One possible rule of thumb is double the maximum pressure in line, e.g. line pressure at pump is ±850 kPa, therefore steam pressure is about 1700 kPa which is close to 300 psig system, therefore use 300 psig steam. Note that this is related to the critical ratio of 0.545 mentioned above.
   Determine how much steam is needed to meet the energy calculated in step II. Note that not just sensible heats are used but also latent heats as the steam condenses. Note as well that the stream composition changes due to the addition of the condensate. The sensible heats of the condensate must also be included as it cools from its point of condensation to its point where it is thermally in equilibrium with the stream.

IV. The next step is to bracket the worst case operating mechanisms, e.g. this means that as froth comes in cold, it is different from a hot froth. The transition takes place between 60-70° C. One way of doing this is assuming that the water content of froth (e.g. 33 wt %) is the only thing being heated. Take the steam total energy (see below for example).
   Note this does not necessarily describe cold froth where water is in parcels covered by bitumen and not always freely available for steam contact, but shows a simplification step that can be used with engineering art to bracket a problem.

Calculations

It is noted that some rounding of numbers was used for clarity of writing.

Pressure atm=98 kPa abs.
Froth $T_{in}$=40° C.
Froth $T_{out}$=90° C.
Pressure Upstream Heater=462 kPag (560 kPa abs.)
Stream composition:

| Component | wt % | vol % |
| --- | --- | --- |
| Bitumen | 60 | 59 |
| Water | 29 | 29 |
| Solids | 11 | 4 |
| Air | 0.009 | 8 |

Froth Cp=2.367 kJ/kg·K
Steam temperature=214.1° C.
Steam pressure=2068.8 kPa abs. (300 psia) (assume for this example no superheat)
Steam density=10.38 kg/m³
Condensate density=848 kg/m³
ΔH steam=2799 kJ/kg
ΔH condensate=916 kJ/kg
ΔH latent heat=1833 kJ/kg
Cp condensate=4.57 kJ/kg
ΔH condensate at fluid pipe pressure and temperature=377 kJ/kg
Flow of froth=1267.9 t/h
   Therefore: energy required to heat froth:

$$Q_{froth}=m \cdot Cp\Delta T=1267.9\times10^3\times2.367\times(90-40)=150,045,569 \text{ kJ/h}$$

Now one finds that by calculation that the required steam rate is 61,958 kg/h (note that this is verified below).
Final condensate temperature=90° C.

$$Q_{steam}=61,958\times2799=173,425,343 \text{ kJ/h (starting point of steam)}$$

$$Q_{condensate}=61,958\times377=23,379,774 \text{ kJ/h (ending point of steam)}$$

So the energy available to heat the froth is:

$$Q = Q_{steam\ start} - Q_{steam\ end} = 173{,}425{,}343 - 23{,}379{,}774 = 150{,}045{,}569\ kJ/h$$

So our estimate at the steam mass flow was correct and steam energy above matches froth energy required.

Note that for sake of simplicity conventional nomenclature using negative signs for energy loss and positive for energy gain have been expressly ignored. These can be introduced by following conventional writing styles for ΔH and Q calculations. The results do not differ.

By performing similar ΔH and Q calculations, one can determine the fluid water temperature if all the steam energy went into the water.

In a froth example, the water would rise from 40° C. to 129° C. The vapour pressure of water under those conditions may be determined by calculation.

This calculation helps to not only determine what would be acceptable for a backpressure, but in addition the number of injector to use for stability. By reviewing these results it can be determined that it becomes relatively unreasonable to inject large amounts of energy in one spot. This assumes that the injectors use appropriately sized nozzles to deliver all the steam assigned to an injector.

If we assume for this example that 129° C. is acceptable and it is appropriate to inject this amount of heat into one injector (though it is preferred to divide this heat between 2 to 3 injectors with the later injector having the smallest energy input), then we determine the water vapour pressure at 129° C. as 262 kPa abs. If we tried to press the sub-cooling at least 10° C. higher, this would imply the vapour pressure at 139° C. would be 351 kPa abs. A more appropriate backpressure to deal with upsets may focus on a 20° C. sub-cooling, hence at 149° C. the vapour pressure of water would be 462 kPa abs. What this implies is that the static pressure in the line at the point of injection should stay above 462 kPa abs.

To safely achieve these minimum backpressures with a medium such as froth or a froth based slurry we may tend to use a static head pressure. This is done as the hydraulic losses from froth create surging pressure profiles due to its non-newtonian behaviour. This relates to a weakness of some known processes; with a well behaved fluid with no surging and well controlled backpressure, the injection of steam can be controlled to ensure it stays within a operating region that is well behaved, this being for non-sonic injection.

For fluids that are not well behaved, the minimum pressure can be controlled with a fair level of certainty. To achieve the backpressure we look at the average slurry density after heating and calculate the head in meters. For example, the froth with 10° C. sub-cooling would have 25.4 m of vertical head above the injection point. This can be achieved with a standpipe feeding into a surge or storage vessel.

The standpipe by definition needs to release to atmosphere at the top of the pipe into the vessel, otherwise the siphoning effect reduces the static head.

Now that the operating conditions are known (steam flow required, number of injections, pressure (static) at injection point, steam condition (dry with small amount of superheating)), one focuses on the injectors and what is desired or required for their functionality.

The premise of the injectors is that steam is injected under sonic conditions. This implies that steam has achieved the speed of sound at the exit. Simplistically, this is a velocity limit and the steam will not accelerate further if the downstream pressure is reduced. From a mass perspective, this would imply that there is a fixed amount of steam one can add per nozzle hole (orifice) in the injector. This is not necessarily precisely correct as by increasing the steam pressure one increases the steam density and by having the same velocity one can obtain increased mass.

The steam injector hole size depends on the media one is trying to heat. An increase in viscosity and a decrease in thermal conductivity all drive to elongate the steam plume that forms as the steam is discharged from the holes. An elongated plume is not desirable as it can impinge the wall of the pipe and cause severe erosion, or the plume can be broken off by the crossflow of the media one is trying to heat and then collapse potentially violently at later time. A small stable steam plume helps to cover a variety of stream property transitions.

A 5.6 mm hole is selected for the following example. If one assumes the injector is a standpipe that has the holes tapped into it, then for this example a 2 inch' injector will have 3.91 mm wall thickness for a schedule 40 pipe.

From Blevins, an orifice is considered an orifice if it meets the following conditions: thickness<d/8, where d=hole diameter.

For the present example:
Thickness=3.91 mm
d/8=5.6/8=0.7 mm

Therefore, thickness is not smaller than d/8 so one must review the next parameter.

Here, it is worth considering why one should bother about the definition of sharp edge orifice. The thicker the orifice, the greater the chance for choking to occur at the variable flow scenarios through the hole. It is somewhat simplistic to just apply a thin edge orifice rule, but it avoids a complicated review of geometry and edge separation under a transitioning regime from sonic to subsonic.

Thus, assuming that it cannot be simplistically treated as a sharp edge orifice, one now treats it as a small pipe. This allows one to estimate under the worse case condition what the steam condition is as it exits the orifice and at which point we want the transition to sonic velocity to occur. This ensures that the flow is always from the hole into the process.

Another benefit of this simplifying assumption is that larger steam pressures and sonic conditions ensure a violent and disruptive force leaving the hole. This tends to break up the local liquid, e.g. bitumen and the large mass of velocity in the jet create sufficient disruption for high viscosity fluids and non-Newtonian fluids.

The calculation for pipe losses dealing with critical flow of compressible fluids tended to be based on charts such as those by Crane in its Manual. Using this may seem tedious due to some of the assumptions made to cover the variability of the stream we are using. A more simplistic method developed from *Thermodynamic Principles* by Kumar (Chem. Eng. October 2002, page 62) allows for ease of calculation as appropriate for the level of this system and its non-uniform often non-Newtonian fluids.

Note that some level of refinement may be desirable in these calculations as to the decision to use isothermal or adiabatic conditions. For a true steam flow through the orifice as described above, the answer may lie in between. The large mass of the metal of the injector pipe and the large volume of steam in the main injector system will ensure that the injector and its wall are near steam temperatures. When steam moves through the orifice it cannot expand adiabatically due to the heat source of the walls. It is not a perfect isothermal expansion either as the heat conduction and convection are relatively short.

Conventional orifice calculations state the following:

Flow=C×A×V

A=area of orifice
V=velocity
C=0.65 for sharp edge orifices m=flow×ρ=C×A×Σ×V, where ρ is density It follows that for choked flow we know that the vapour is at sonic conditions. The speed of sound in steam in this example point is roughly 500 m/s.
Thus for the 5.6 mm orifice A=2.46×10⁻⁵ m².

Flow=0.65×2.46×10⁻⁵×500=0.008 m³/s=29 m³/h or 294 kg/h, with a steam density of 10.2 g/cm³.

Using Kumar, we know that for a 2 inch schedule 40 pipe to be used as an injector we would have a hole 3.91 mm long. A 6 inch schedule 40 injector would have 7.11 mm length.

Kumar's equations are as follows for an adiabatic fluid flow:

$$\frac{2}{Ma_1^2(\gamma+1)}\left[\left(\frac{(\gamma+1)Ma_1^2}{2+(\gamma-1)Ma_1^2}\right)^{\frac{(\gamma+1)}{2}} - 1\right] + $$
$$2\ln\sqrt{\frac{2+(\gamma+1)Ma_1^2}{(\gamma+1)Ma_1^2}} + 12 = \emptyset \quad \text{Equation 1}$$

$$r = \left(\frac{P_2}{P_0}\right)_{cr} = \frac{[0.5\times(\gamma+1)Ma_1^2]^{\frac{\gamma}{2}}}{[1+0.5(\gamma-1)Ma_1^2]^{\frac{\gamma(\gamma+1)}{2(\gamma-1)}}} \quad \text{Equation 2}$$

$$Y_{cr} = \sqrt{\frac{k(1+r)}{2\left(k+2\ln\left[\frac{1}{r}\right]\right)}} \quad \text{Equation 3}$$

$$W = 0.126\, D^2 Y_{cr}\sqrt{\frac{P_0-P_2}{kV_0}} \quad \text{Equation 4}$$

D=internal pipe diameter (mm)
K=resistance or loss coefficient
L=length of pipe (m)
$P_a$=ambiant pressure (kPa abs.)
$P_o$=stagnation upstream pressure (kPa abs.)
$P_1$=pressure at inlet tip of the pipe (kPa abs.)
$P_2$=pressure at outlet tip of the pipe (kPa abs.)
$Ma_1$=Mach number at inlet tip of the pipe
$Ma_2$=Mach number at outlet tip of the pipe
γ=ratio of specific heat at constant pressure to specific heat at constant volume at upstream conditions (dimensionless)

$$r = \text{overall critical pressure ratio (dimensionless)}\left(\frac{P_2}{P_0}\right)_{cr}$$

$V_o$=upstream specific volume (m³/kg)
W=mass flow rate (kg/h)

Thus for this example, if one uses 5° C. superheat for steam:
D=5.6 mm
$P_a$=560 kPa abs.
$P_0$=2069 kPa abs.
K=1.525146
γ=1.3

$V_0$=0.09801 m³/kg
L=0.0039 m

One now calculates $Ma_1$=0.4884584 to enable Equation 1 to equal zero.

Now r is calculated:
r=0.3621
$Y_{cr}$=0.540399

And from Equation 2 one can now calculate $P_2$ at pipe outlet tip:
$P_2$=749 kPa abs.

Now one checks if a shock exists at the exit to instream conditions:
$P_a - P_2$=−189 kPa This indicates a choked condition (i.e. $P_a - P_2 < 0$) does indeed exist.

The critical mass flow can now be calculated using Equation 4 or modified for $$\text{adiabatic,} = 0.089 \times d^2 + \sqrt{\gamma \times \left(\frac{P_0}{V_0}\right) \times r\left(\frac{\gamma+1}{\gamma}\right)}.$$

$W_{isothermal}$=201.4 kg/h
$W_{adiabatic}$=188.2 kg/h

One can compare this back to the standard orifice calculation V=C×A×V=294 kg/h.

It is seen that the standard orifice calculation overestimates the quantity of steam per orifice hole. This would imply that should steam pressure be adjusted for the orifice calculation that by the time the steam got to the exit it may no longer be choked. This would lead to issues for multiple difficult fluids such as froth or bituminous slurry streams.

Now one needs to look at the steam injectors. If one requires 61958 kg/h of steam to heat the froth stream, then one now knows that one has an average 201.4 kg/h per orifice.

This means that one requires at least 308 holes assuming one is using a 2 inch schedule 40 injector then the pipe diameter is 2.315 inches. This means it has a circumference of 190 mm.

Figure 8B:
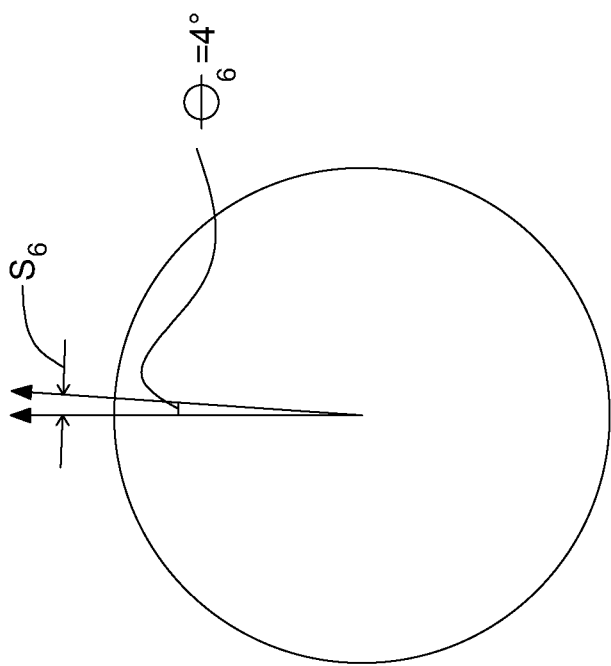
FIGS. 8a and 8b are schematic diagrams for example injector calculations.
Figure 8A:
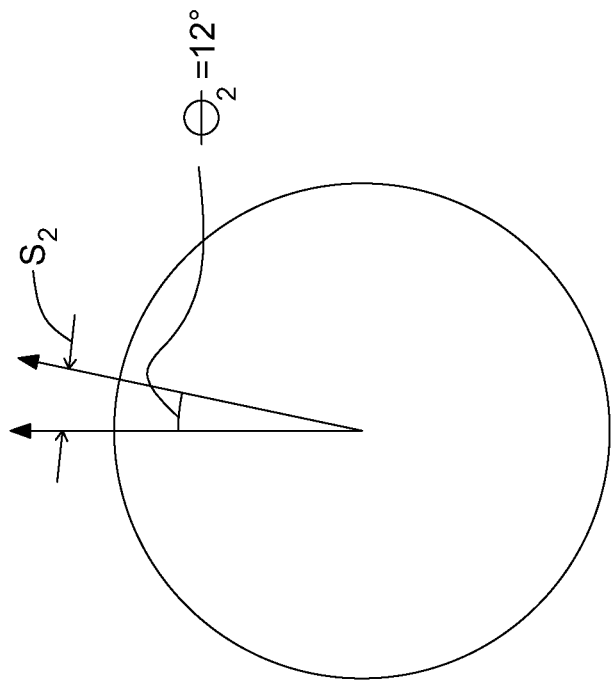

The holes should be spaced so that there is sufficient space so that the adjacent plumes do not join as the flow of fluid is across the injector. The governing factors are the injector size and plume length, as well as crossflow velocity. One can easily see that a smaller injector has longer curvature and greater divergence of the exit vector from the hole. Referring to FIGS. 8a and 8b, for the same spacing of 12 mm for both $S_2$ and $S_6$, the divergence on a 2 inch injector is 12 degrees and for a 6 inch injector it is only 4 degrees thus allowing more chance for plume interference and reinforcing the requirement to add more space. This highlights how spacing is affected by the sizing calculation.

The minimum spacing between orifices is the height of the stable steam region (still to be calculated). If taking the counterpoint of each hole we should add the radius of two adjacent holes. This is driven by configuration so this should be adjusted by the orifice layout. Thus, if the estimated plume height is 6.6 mm then the spacing between holes is the following:

$$\text{Spacing between holes} = 6.6 + \frac{5.6}{2} + \frac{5.6}{2} = 12.2 \text{ mm},$$

as a minimum

Note that turbulence that does not allow a uniform flow profile across the injector would mean one should have a larger spacing as the plumes would not be bending over in the same direction so one may end up doubling the distance.

Based on the spacing one sees that, with a circumference of 190 mm, one would only have 16 holes around the injector. One can now calculate the injector length.

Figure 9:
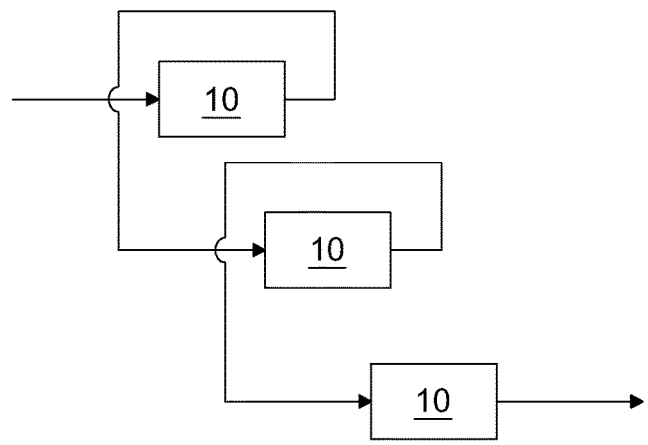
FIG. 9 is a process flow diagram of a compact arrangement of injectors.

If the injector length is too great, the number of injectors should be increased. Note that this calculation works iteratively with the assumptions made up front for the maximum amount of steam to inject in one space based on backpressure requirement. For multiple injectors, good engineering guidelines should be used, giving at least 20 diameters downstream prior to a change in direction or pipe diameter. In addition, between 40 and 50 diameters are recommended prior to the next injector. These guidelines are adjusted based on the fluid heated and the available sub-cooling. Typically the amount of steam decreases in sequence of injection as the sub-cooling decreases. An example of a compact layout is shown in FIG. 9, where there are three injectors in series using 20 diameters downstream between the first turn. With this arrangement, the heaters may be placed next to each other in a compact method and for maintenance the top pipe may be offset by rotating the 90 degree bend.

To establish the plume length one uses heat transfer coefficient. If one wishes to, for the sake of this example, use the heat transfer coefficient of steam in water, one can approximate it by the following formula for dry steam at sonic conditions:

$$h = 80 \times \Delta T_{subcooling} = 80 \times 66.2 = 355 \text{ W/cm}^{2\circ}\text{C}. \pm 20\%$$

Various other formulas exist that can be used.

As per above, one knows the flow of steam through each hole is 0.056 kg/s. The heat of condensation at the stream conditions is 2437 kJ/kg (steam at steam supply conditions—condensate at pipe conditions).

The steam plume is assumed to be conical. More accuracy can be obtained by using a more refined geometric representation of the steam.

$$\text{Area}_{steam\ plume} = \pi \times r \times \sqrt{r^2 + h^2}$$

By assuming a height of 6.6 mm, one knows that for the 5.6 mm hole there is a flux of 227 g/cm²·s at 0.056 kg/s.

This implies that the energy available is $Q_{stream} = 2437 \times 0.056$ kg/s=136 375 W.

Now, compare this to the plume.

By using the height of 6.6 mm one calculates the surface area over which the condensation (heat transfer) will occur.

Plume surface area 5.8 cm².

Thus, energy dissipated over plume surface per unit area:

$$= \frac{136{,}375}{5.9} = 23463 \text{ W/cm}^2.$$

Now compare this to the calculation performed for heat transfer:

$$H_t = 355 \times 66 = 23463 \text{ W/cm}^2.$$

It is again noted that sign convention has been ignored for ease of example.

The two numbers are the same. This means our estimate of 6.6 mm for the plume height was correct.

It can now be seen how a fluid with a lower specific heat will elongate the plume as h will decrease and by increasing the viscosity we also reduce h. So a multiphase fluid if it is not completely homogeneous down to a very small level will behave in a very unpredictable way when steam is injected.

By focusing on the lowest boiling point (highest vapour pressure) component, one can establish conditions that although generally overdesigned provide a means to prevent at times catastrophic conditions for unstable operation. For froth the bitumen will generally not boil but will have a tendency when cold to capture steam plume if they elongate too far and create hammer or the water component may flash and recollapse creating hammer.

The froth changes conditions as well as it transitions above 60° C. to 70° C. range.

These calculations can now be used to investigate pipe sizes for the process stream and if the orifice size or steam conditions need to change to avoid impingement on the pipe wall. The plume of steam if bent very small will have a small region of rapidly moving condensate and process fluid straddling the stable steam plume. It is desirable to ensure that the pipe wall for the process fluid is never in this region. By appropriate orifice size and spacing the region near the injector is a majority of condensate and dilute process fluid. Moving to the tip of the plume the condensate and process fluid are moving rapidly away from the plume moving more process fluid with it. This would create a relatively concentrated movement of process fluid against the pipe wall if the pipe wall was too close. Depending on the composition of the bituminous slurry (i.e. solids content) severe erosion may occur.

The location and spacing of the injector should also be accounted for in the calculation.

For example, for a small plume from a 5.6 mm hole (only 6.6 mm) one can assume the rapid moving condensate system is double the plume height, thus ±14 mm.

Figure 10:
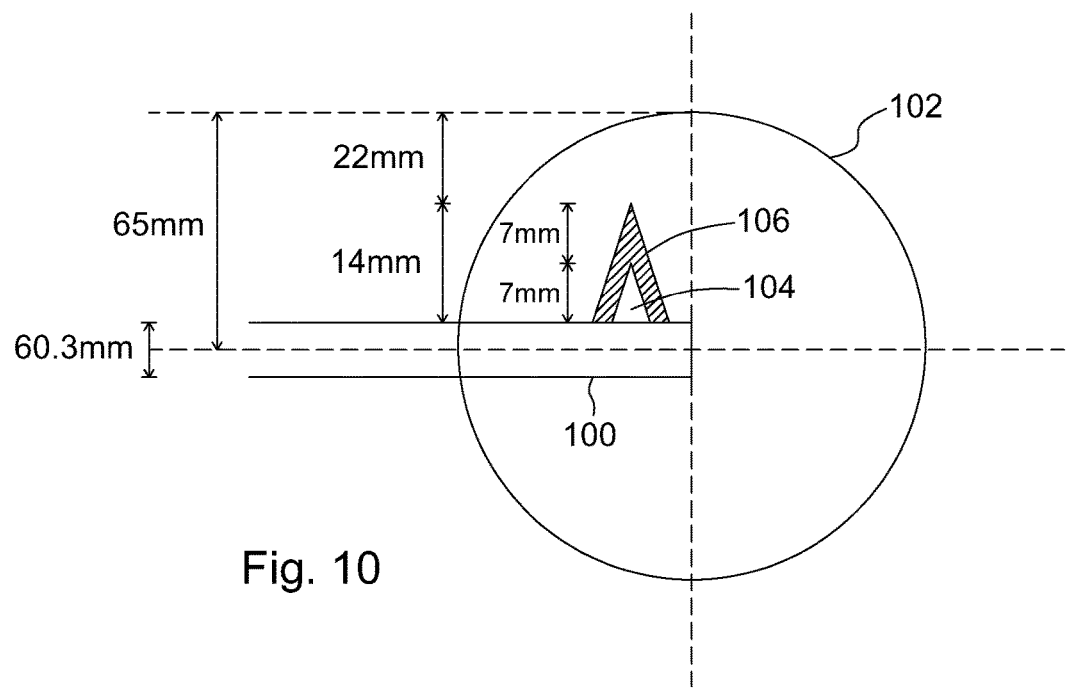
FIG. 10 is a schematic diagram a direct steam injector pipe and a bitumen froth pipeline showing steam and condensate envelope plumes for example calculations regarding location and spacing of injector.

Reference is made to FIG. 10 in this regard. In FIG. 10, a steam injector pipe 100 is shown extending into a bitumen froth pipeline 102. The end tip of the steam injector pipe 100 is located in the middle of the froth pipeline 102. There is a steam plume 104 extending beyond the wall of the injector pipe 100 in the direction of the inner wall of the froth pipeline 102. The steam plume 104 is surrounded by an envelope of condensate and process fluid 106 also extending toward the inner wall of the froth pipeline 102. The dimensions of various components and elements are shown in millimeters. The estimated clearance to the inner pipeline wall is calculated as follows:

$$65.2 - 14 - \frac{60.3}{2} = 22$$

(units are mm and note that numbers are rounded up)

Here a judgement call is made depending on the composition of the stream as to the required clearance as higher quantities of solids of a higher abrasive nature in a low viscosity medium requires a much greater clearance.

In summary, the above methodologies, assumptions, guidelines and example calculations may be used in connection with the design and operation of embodiments and aspects of the systems and processes of the present invention.

Finally, it should be understood that the present invention is not limited to the particular embodiments and aspects described and illustrated herein.

The invention claimed is:

1. A process for heating an oil sands bitumen froth stream that includes bitumen and water and having variable heating requirements, comprising:

injecting steam directly into the oil sands bitumen froth stream at a steam pressure through a plurality of nozzles, wherein the injecting of the steam and the size and configuration of the nozzles are provided to achieve sonic steam flow and wherein the nozzles are positioned such that steam jet plumes extend into the oil sands bitumen froth stream while avoiding impingement on adjacent walls and such that adjacent steam jet plumes do not join;

operating the plurality of the nozzles to vary steam injection by varying a number of the nozzles through which the injecting of the steam occurs in response to the variable heating requirements for the oil sands bitumen froth stream;

subjecting the oil sands bitumen froth stream to backpressure downstream of the steam injection, sufficient to enable sub-cooling relative to the boiling point of water.

2. The process of claim 1, wherein the steam pressure is at least about 150 psig.

3. The process of claim 1, wherein the steam pressure is at least about 300 psig.

4. The process of claim 1, wherein the steam is superheated steam.

5. The process of claim 1, wherein the nozzles are each sized to have a throat diameter up to about 15 mm.

6. The process of claim 1, wherein the nozzles are each sized to have a throat diameter up to about 10 mm.

7. The process of claim 1, wherein the nozzles are sized and configured to each operate as an orifice and the sonic steam flow is provided according to orifice flow requirements.

8. The process of claim 1, wherein the nozzles are sized and configured to each operate as a pipe and the sonic steam flow is provided according to pipe flow requirements.

9. The process of claim 1, wherein at least a portion of the backpressure is provided by static pressure downstream of the injection of the steam.

10. The process of claim 9, wherein the static pressure is provided by a stand pipe to a holding tank inlet.

11. The process of claim 1, wherein at least a portion of the backpressure is provided by tank pressurization downstream of the injection of the steam.

12. The process of claim 1, wherein at least a portion of the backpressure is provided by at least one valve device downstream of the injection of the steam.

13. The process of claim 1, wherein at least a portion of the backpressure is provided by at least one pipeline configuration downstream of the injection of the steam.

14. The process of claim 1, wherein the backpressure is provided to enable the sub-cooling of the oil sands bitumen froth stream of at least 10° C. relative to the boiling point of water.

15. The process of claim 1, wherein the backpressure is provided to enable the sub-cooling of the oil sands bitumen froth stream of at least 20° C. relative to the boiling point of water.

16. The process of claim 1, comprising determining the variable heating requirements of the oil sands bitumen froth based on variable temperature.

17. The process of claim 1, comprising determining the variable heating requirements of the oil sands bitumen froth based on variable composition thereof.

18. The process of claim 1, comprising determining the variable heating requirements of the oil sands bitumen froth based on variable water content thereof.

19. The process of claim 1, comprising serially performing the injecting of the steam into the oil sands bitumen froth stream in a plurality of direct injection steam heaters arranged in series.

20. The process of claim 1, comprising performing the injecting of the steam into the oil sands bitumen froth stream in a plurality of direct injection steam heaters arranged in parallel.

21. The process of claim 1, wherein bitumen froth stream is derived from a primary separation vessel selected from at least one of an inclined plate settling vessel, a gravity settling vessel, a centrifuge and a cyclone.

22. The process of claim 1, wherein the injecting of the steam forms steam jets co-directionally with flow of the oil sands bitumen froth stream.

23. The process of claim 1, wherein the backpressure is provided sufficient to enable sub-cooling relative to the boiling point of a low boiling point component having a lower boiling point than water.

24. The process of claim 23, wherein the low boiling point component is a light hydrocarbon.

25. The process of claim 1, comprising pumping the oil sands bitumen froth stream through a supply pump at a sufficient pressure to allow the backpressure.

26. The process of claim 1, further comprising supplying heated oil sands bitumen froth to a storage tank.

27. The process of claim 26, wherein the storage tank comprises a bitumen froth inlet for supplying the heated oil sands bitumen froth thereto and controlling aeration of the heated oil sands bitumen froth.

28. The process of claim 27, wherein the bitumen froth inlet comprises a perforated pipe extending downward from an upper portion of the storage tank to a lower portion of the storage tank below a liquid level in the storage tank.

29. The process of claim 27, wherein the bitumen froth inlet comprises a sloped launder extending from above tank high level to below tank low level.

30. The process of claim 29, further comprising supplying a water wash into the storage tank at or proximate an upper part of the sloped launder.

31. The process of claim 26, comprising recirculating a portion of the heated oil sands bitumen froth as a recycled bitumen froth stream back into the oil sands bitumen froth stream upstream of the steam injection.

32. The process of claim 26, wherein the storage tank is configured to be atmospheric pressure.

33. The process of claim 26, wherein the storage tank is configured to be pressurized.

34. The process of claim 1, further comprising supplying heated oil sands bitumen froth to a froth deaerator vessel.

35. The process of claim 34, wherein the froth deaerator vessel is configured to be pressurized with purge gas.

36. The process of claim 34, wherein the froth deaerator vessel comprises a sloped launder inlet extending from above liquid level to below liquid level and being configured for inletting the oil sands bitumen froth.

37. The process of claim 34, wherein the froth deaerator vessel comprises a perforated pipe inlet extending downward from an upper portion of a storage tank to a lower portion of the storage tank below a liquid level in the deaerator vessel.

38. The process of claim 1, further comprising supplying heated oil sands bitumen froth to a froth slurry column.

39. The process of claim 38, wherein the froth slurry column comprises an inlet.

40. The process of claim 39, wherein the inlet comprises a flow restriction, a valve or a nozzle.

41. The process of claim 38, further comprising returning a portion of the heated oil sands bitumen froth back into the froth slurry column.

42. The process of claim 1, comprising controlling the nozzles and monitoring temperature of heated oil sands bitumen froth stream using a temperature control device connected.

43. The process of claim 1, wherein the nozzles are positioned and nozzle orifices are sized such that an envelope of condensate and process fluid surrounding the steam jet plumes extend into the oil sands bitumen froth stream while avoiding impingement on the adjacent walls.

44. The process of claim 1, wherein the oil sands bitumen froth stream is an underflow tailings stream from a froth separation vessel from a solvent froth treatment operation.

45. The process of claim 44, wherein the solvent in the froth treatment operation is paraffinic solvent.

46. The process of claim 1, wherein the oil sands bitumen froth stream is heated up to 130° C.

47. The process of claim 1, wherein the oil sands bitumen froth stream is heated above 95° C. and up to 130° C.

48. A process for heating an oil sands bitumen froth stream that includes bitumen and water and having variable heating requirements, comprising: injecting steam directly into the oil sands bitumen froth stream at a steam pressure through a plurality of nozzles, wherein the injecting of the steam and the size and configuration of the plurality of nozzles are provided to achieve sonic steam flow, and wherein adjacent nozzles of the plurality of nozzles are positioned such that steam jet plumes extend into the oil sands bitumen froth stream while avoiding impingement on adjacent walls;

varying steam injection through the nozzles in response to the variable heating requirements for the oil sands bitumen froth stream;

subjecting the oil sands bitumen froth stream to backpressure downstream of the steam injection, sufficient to enable sub-cooling relative to the boiling point of water.

49. The process of claim 48, wherein the steam pressure is at least about 150 psig.

50. The process of claim 48, wherein the steam pressure is at least about 300 psig.

51. The process of claim 48, wherein the nozzles are each sized to have a throat diameter up to about 15 mm.

52. The process of claim 48, wherein the nozzles are each sized to have a throat diameter up to about 10 mm.

53. The process of claim 48, wherein the backpressure is provided to enable the sub-cooling of the oil sands bitumen froth stream of at least 10° C. relative to the boiling point of water.

54. The process of claim 48, wherein the backpressure is provided to enable the sub-cooling of the oil sands bitumen froth stream of at least 20° C. relative to the boiling point of water.

55. The process of claim 48, wherein the oil sands bitumen froth stream is an underflow tailings stream from a froth separation vessel from a solvent froth treatment operation.

56. The process of claim 55, wherein the solvent in the froth treatment operation is paraffinic solvent.

57. The process of claim 48, wherein the oil sands bitumen froth stream is heated up to 130° C.

58. The process of claim 48, comprising serially performing the injecting of the steam into the oil sands bitumen froth stream in a plurality of direct injection steam heaters arranged in series.

59. The process of claim 48, comprising performing the injecting of the steam into the oil sands bitumen froth stream in a plurality of direct injection steam heaters arranged in parallel.

\* \* \* \* \*